(12) United States Patent
Kobayashi et al.

(10) Patent No.: US 7,671,907 B2
(45) Date of Patent: Mar. 2, 2010

(54) IMAGE-CAPTURING APPARATUS

(75) Inventors: Masao Kobayashi, Nagano (JP); Hideo Nakamura, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 562 days.

(21) Appl. No.: 11/563,256

(22) Filed: Nov. 27, 2006

(65) Prior Publication Data

US 2007/0188650 A1    Aug. 16, 2007

(30) Foreign Application Priority Data

Feb. 15, 2006    (JP) .............................. 2006-038624

(51) Int. Cl.
*H04N 5/262* (2006.01)
*H04N 5/247* (2006.01)

(52) U.S. Cl. .................................... 348/240.2; 348/264

(58) Field of Classification Search ........................ None
See application file for complete search history.

(56) References Cited

U.S. PATENT DOCUMENTS 7,417,674 B2 * 8/2008 Gruhlke ................... 348/240.3

2008/0029708 A1 * 2/2008 Olsen et al. ................. 250/372

FOREIGN PATENT DOCUMENTS

| JP | 4345378 | 12/1992 |
|----|---------|---------|
| JP | 2002314888 | 10/2002 |
| JP | 2003298919 | 10/2003 |

* cited by examiner

*Primary Examiner*—Justin P Misleh
(74) *Attorney, Agent, or Firm*—Thomas J. Strouse; Peyton C. Watkins

(57) ABSTRACT

A digital camera enables high-speed zooming operation without use of a zoom lens. Light originating from a fixed-focal-length lens is split into two beams by a beam splitter, to thus form respective images on a first image sensor and a second image sensor. The first image sensor and the second image sensor are equal to each other in terms of the number of pixels, but differ from each other in terms of a pixel size. The first image sensor acquires a wide image, and the second image sensor acquires a telephotography image. An output is produced by means of switching between the first image sensor and the second image sensor, in response to zooming operation. When the image from the first image sensor is recorded, focus detection is performed by use of an image signal from the second image sensor, to thus effect automatic focusing.

11 Claims, 21 Drawing Sheets

IMAGE-CAPTURING APPARATUS

CROSS REFERENCE TO RELATED APPLICATIONS

This application claims priority to Japanese Patent Application No. 2006-038624 filed on Feb. 15, 2006, which is incorporated herein by reference in its entirety.

FIELD OF THE INVENTION

The present invention relates to an image-capturing apparatus, such as a digital camera or the like and, more particularly, to an image-capturing apparatus having a plurality of image-capturing elements.

BACKGROUND OF THE INVENTION

Many digital cameras currently have a zoom lens and a single image sensor, and capture a still image and a motion picture. Captured images are digitally processed to thus generate digital image files, which are stored in memory within a digital camera. A digital image file is then transferred to and displayed on a computer, or transferred to and printed by a printer.

A small size and a wide optical zoom range are desirable characteristics of a digital camera. A user prefers a wider zoom range to a limited zoom range. However, when a digital camera is provided with a wide zoom lens without sacrificing the quality of a captured image, the size of the digital camera is increased. An expensive camera, such as a single-lens reflex optical camera, enables use of a plurality of interchangeable lenses; for example, a 28-70 mm zoom lens and a 70-210 mm zoom lens. However, in the case of a compact camera, use of a plurality of interchangeable lenses poses inconvenience to the user.

Some digital cameras use a single lens or a plurality of image sensors to generate a single color mage. Light originating from a subject is split into a plurality of colors by means of a prism beam splitter. A plurality of monochrome image sensors are used for capturing RGB color images.

Japanese Patent Publication Laid-Open No. 2003-298919 describes that a small CCD having a high pixel density and a large CCD having a low pixel density are arranged for respective two optical systems.

Japanese Patent Publication Laid-Open No. 2002-314888 describes a configuration where a plurality of (three) image-capturing elements are provided in a single optical system. An attempt is made to enlarge an image-capturing range by means of setting view angle ranges of three image-capturing elements so as to differ from each other.

Japanese Patent Publication Laid-Open No. Hei-4-345378 describes a configuration where three CCDs are provided so as to be respectively assigned to three optical systems having different focal lengths; and where, by means of switching the CCDs, an image of a given focal length can be selectively acquired, or a plurality of images of different focal lengths can be simultaneously acquired.

However, in a configuration employing a plurality of optical systems, such as that described in Japanese Patent Publication Laid-Open No. 2003-298919 or Japanese Patent Publication Laid-Open No. Hei-4-345378, a parallax arises for reasons of differences in relative positions of a plurality of optical systems when the image of a single subject is captured, and hence there arises a necessity for compensation for a parallax or image processing taking into consideration a parallax. Meanwhile, in a configuration where a plurality of image-capturing elements are provided for a single optical system, such as that described in Japanese Patent Publication Laid-Open No. 2002-314888, such a problem of parallax does not arise. In Japanese Patent Publication Laid-Open No. 2002-314888, an attempt is made solely to enlarge an image-capturing range by means of simply making view angle ranges different from each other; and no consideration is paid to a more effective method of use, such as implementation of zooming action by use of a plurality of image-capturing elements, and the like. Moreover, in a case where a plurality of image-capturing elements are used, there is a risk of an increase in the degree of complication and size of the configuration and an increase in power consumption when compared with a configuration using a single image-capturing element. However, no consideration is paid to attainment of miniaturization and power-savings in a case where a plurality of image-capturing elements are used.

SUMMARY OF THE INVENTION

The present invention has been conceived in light of the conventional drawbacks, and provides an image-capturing apparatus which has a plurality of image-capturing elements with respect to a single optical system and which efficiently actuates a plurality of image-capturing elements, to thus perform zooming action and reduce power consumption.

The present invention provides an image-capturing apparatus comprising: a single optical system; split means for splitting light originating from the single optical system into a plurality of lights; a plurality of image-capturing elements which receive the plurality of lights and have the same number of pixels and different pixel sizes; and drive means for driving the plurality of image-capturing elements.

In one embodiment of the present invention, the image-capturing apparatus further comprises angle-of-view change operation means; display means; and control means for outputting, in a switching manner, image signals output from the plurality of image-capturing elements to the display means in response to operation of the angle-of-view change operation means.

In another embodiment of the present invention, the plurality of image-capturing elements are formed from a first image-capturing element, and a second image-capturing element which is smaller in pixel size than the first image-capturing element; and the control means outputs an image signal from the first image-capturing element while an angle-of-view change position falls within an area from a wide end of the first image-capturing element to a threshold position set in an angle-of-view change range of the second image-capturing element, and outputs an image signal from the second image-capturing element while the angle-of-view change position falls within a range from the threshold position to a telephotography end. In this case, when an image is captured by use of an image signal from the first image-capturing element, a focus may also be controlled through use of an image signal from the second image-capturing element.

In yet another embodiment of the present invention, the plurality of image-capturing elements are formed from a first image-capturing element, a second image-capturing element which is smaller in pixel size than the first image-capturing element, and a third image-capturing element which is smaller in pixel size than the second image-capturing element; and the control means outputs an image signal from the first image-capturing element while the angle-of-view change position falls within an area from a wide end of the first image-capturing element to a first threshold position set in an angle-of-view change range of the second image-capturing element, outputs an image signal from the second image-capturing element while the angle-of-view change position falls within a range from the first threshold position to a second threshold position set in the angle-of-view change range of the third image-capturing element, and outputs an image signal from the third image-capturing element while the angle-of-view change position falls within a range from the second threshold position to a telephotography end. In this case, a focus may also be controlled through use of an image signal from the second image-capturing element or the third image-capturing element when an image is captured by use of an image signal from the first image-capturing element, and a focus may also be controlled through use of an image signal from the third image-capturing element when an image is captured by use of an image signal from the second image-capturing element.

In the present invention, zoom operation can be performed at high speed by means of switching image-capturing elements as a result of combination of a single optical system with a plurality of image-capturing elements having the same number of pixels and different pixel sizes. The plurality of image-capturing elements are made identical with each other in terms of the number of pixels, whereby a drive circuit for driving the image-capturing elements is shared to thus simplify a circuit configuration and diminish power consumption. Moreover, any image-capturing elements of a plurality of image-capturing elements are simultaneously driven by means of a drive circuit, so that a plurality of images of different magnification factors can also be simultaneously output or images can also be merged.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Embodiments of the present invention will be described hereinbelow by reference to the drawings, in connection with a case where a digital camera has two image sensors, a case where a digital camera has three image sensors, and a case where a digital camera has four image sensors. As a matter of course, the same also applies to a digital camera having five or more image sensors.

<When a Digital Camera has Two Image Sensors>

Figure 1:
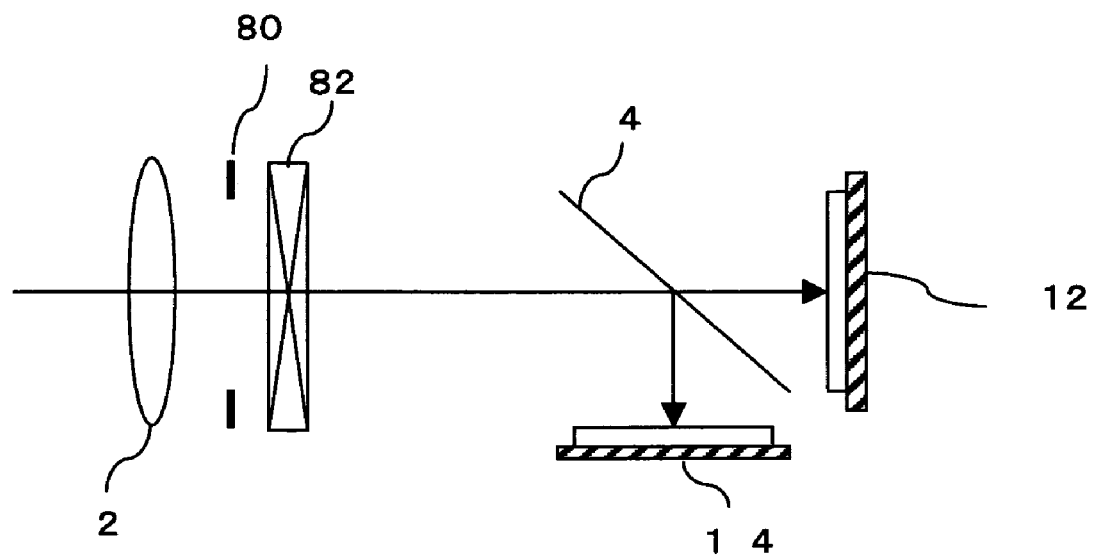
FIG. 1 is a conceptual block diagram of a digital camera having two image sensors.
Figure 2:
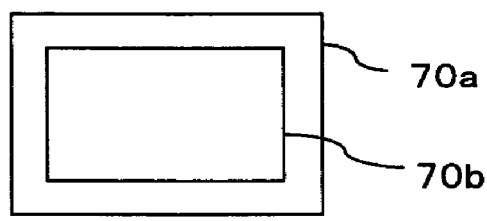
FIG. 2 is a descriptive rendering of the angles of view of the two image sensors.

FIG. 1 shows a conceptual configuration of a digital camera according to an embodiment of the present invention. The digital camera comprises a lens 2, an aperture 80, a shutter 82, a beam splitter 4 for splitting light from the lens 2 into two beams, and two image sensors 12, 14 for receiving the light output from the beam splitter 4. The first image sensor 12 and the second image sensor 14 have the same number of pixels but differ from each other in terms of an image size (a pixel size). Specifically, there stands a relationship of the size of the first image sensor 12>the size of the second image sensor 14. The lens 2 may be a fixed-focal-length lens. Since the image sensors 12, 14 differ from each other in terms of an image size, the angles of view acquired by the respective image sensors differ from each other. The first image sensor 12 is of a relatively-wide angle of view, and the second image sensor 14 is of a relatively-narrow angle of view. The first image sensor 12 can also be said to acquire a wide image, and the second image sensor 14 can also be said to acquire a telephotographic image. The angle of view of an image sensor adopted when an image is captured by way of a fixed-focal-length lens or the angle of view of each of the image sensors employed when an image is captured by way of a wide end of a zoom optical system is referred to as a unique angle of view of each of the image sensors. A unique angle of view of the image sensor disposed in a single optical system varies according to a pixel size of the image sensor. Specifically, the unique angle of view becomes greater as the pixel size becomes greater. FIG. 2 shows a unique angle of view 70*a* of the first image sensor 12 and a unique angle of view 70*b* of the second image sensor 14 in a contrasted manner. Since the optical system is singular, no parallax exists between the unique angle of view acquired by the first image sensor 12 and the unique angle of view acquired by the second image sensor 14. Switching between a wide angle of view and a narrow angle of view can be performed by means of appropriately switching between the image sensors 12 and 14. Even when the lens 2 is embodied as a fixed-focal-length lens, optical zooming action can be realized. Switching between the wide angle of view and the narrow angle of view can be effected by means of actuation of a zoom switch or actuation of a switch for toggling between the image sensors 12 and 14. When switching between the wide angle of view and the narrow angle of view is performed by means of actuation of a zoom switch, the first image sensor 12 is selected at a wide side, and the second image sensor 14 is selected at the telephotography side. An angle of view existing between the unique angle of view of the first image sensor 12 and the unique angle of view of the second image sensor 14 can be acquired through electronic zooming action for electronically enlarging an image signal obtained by the first image sensor 12. Namely, when the zoom switch is actuated sequentially from the wide side to the telephotography side, a wide image acquired by the first image sensor 12 is first obtained, and an electronic zoomed image of the first image sensor 12 is sequentially acquired in response to actuation of the zoom switch. When the unique angle of view of the second image sensor 14 has been attained, the first image sensor 12 is switched to the second image sensor 14, whereby a telephotographic image of the second image sensor 14 is output. Timing at which the first image sensor 12 is switched to the second image sensor 14 can be arbitrarily set. In addition to at the unique angle of view of the second image sensor 14, a changeover threshold position may also be set at a position closer to the telephotography side than to the unique angle of view. When an electronic zooming range of an image acquired by the second image sensor 14 is assumed to be a range where an angle of view can be altered, the threshold position is arbitrarily set within the range where the angle of view of the second image sensor 14 is altered. An image or an electronically-zoomed image, which is acquired at the unique angle of view of the first image sensor 12, is output at a position closer to the wide side rather than to the threshold position. An image or an electronically-zoomed image, which is acquired at the unique angle of view of the second image sensor 14, is output at a position closer to the telephotography side rather than to the threshold position. Since the image quality of the electronically-zoomed image is deteriorated, the threshold position is preferably set at the position of the unique angle of view of the second image sensor 14.

The lens 2 is basically a fixed-focal-length lens but can also be embodied as a variable-focal-length lens. The second image sensor 14 can acquire a telephotographic image. In order to cause the second image sensor 14 to acquire a telephotographic image of an arbitrary area of a wide image captured by the first image sensor 12, the second image sensor 14 must merely be provided with a configuration which enables movement of the second image sensor within a plane perpendicular to the optical axis.

In the present embodiment, in order to simplify the configuration, when the image sensors 12, 14 are provided with a common aperture 80 to perform automatic exposure (AE) as shown in FIG. 1, adjustment must be carried out such that the image sensors 12, 14 have the same sensitivity, because the image sensors 12, 14 are of different sizes and, hence, have different sensitivities (i.e., the sensitivity of the first image sensor 12 is greater than the sensitivity of the second image sensor 14). Specifically, it is better to use any of the following methods.

(1) A difference between sensitivities is compensated by means of adjusting the transmissivity of the beam splitter 4 in accordance with the sensitivities of the respective image sensors 12, 14.

(2) A difference between the sensitivities of the respective image sensors 12, 14 is compensated by use of a shutter.

(3) A difference between sensitivities is compensated by means of adjusting gains of the respective image sensors 12, 14.

(4) A difference between the sensitivities of the respective image sensors 12, 14 is compensated by use of an ND filter.

Since the image sensors 12, 14 are equal to each other in terms of the number of pixels, the image sensors 12, 14 can share a driver in addition to a case where each of the image sensors 12, 14 is provided with a driver, thereby enabling the configuration of the digital camera to be simplified. When the driver is shared, the first image sensor 12 is driven at a certain timing to thus acquire a wide image. The image sensor is switched to the second image sensor 14 at another timing, to thus acquire a telephotographic image. When a wide image and a telephotographic image must be acquired in real time, such as when the telephotographic image is superimposed on the wide image, or the like, each of the image sensors 12, 14 is preferably provided with a driver. When the image sensors 12, 14 are not driven simultaneously, the driver can be shared as mentioned previously. In addition, in place of the beam splitter 4, there can also be adopted a combination of a half mirror and a reflection mirror. The reflection mirror is configured so as to be pivotable, and can be caused to advance to or recede an optical path in synchronism with control for switching driving of the respective image sensors 12, 14. Thus, a loss in the quantity of light entering the respective image sensors 12, 14 can be suppressed. Meanwhile, when the image sensors 12, 14 are each provided with a driver and driven independently, the image sensors 12, 14 differ from each other in terms of an image size. Accordingly, when an image of a subject is captured by means of driving the first image sensor 12, distance-measuring performance can be enhanced by use of an image signal output from the second image sensor 14, which is smaller in size than the first image sensor 12, for detection.

Figure 3:
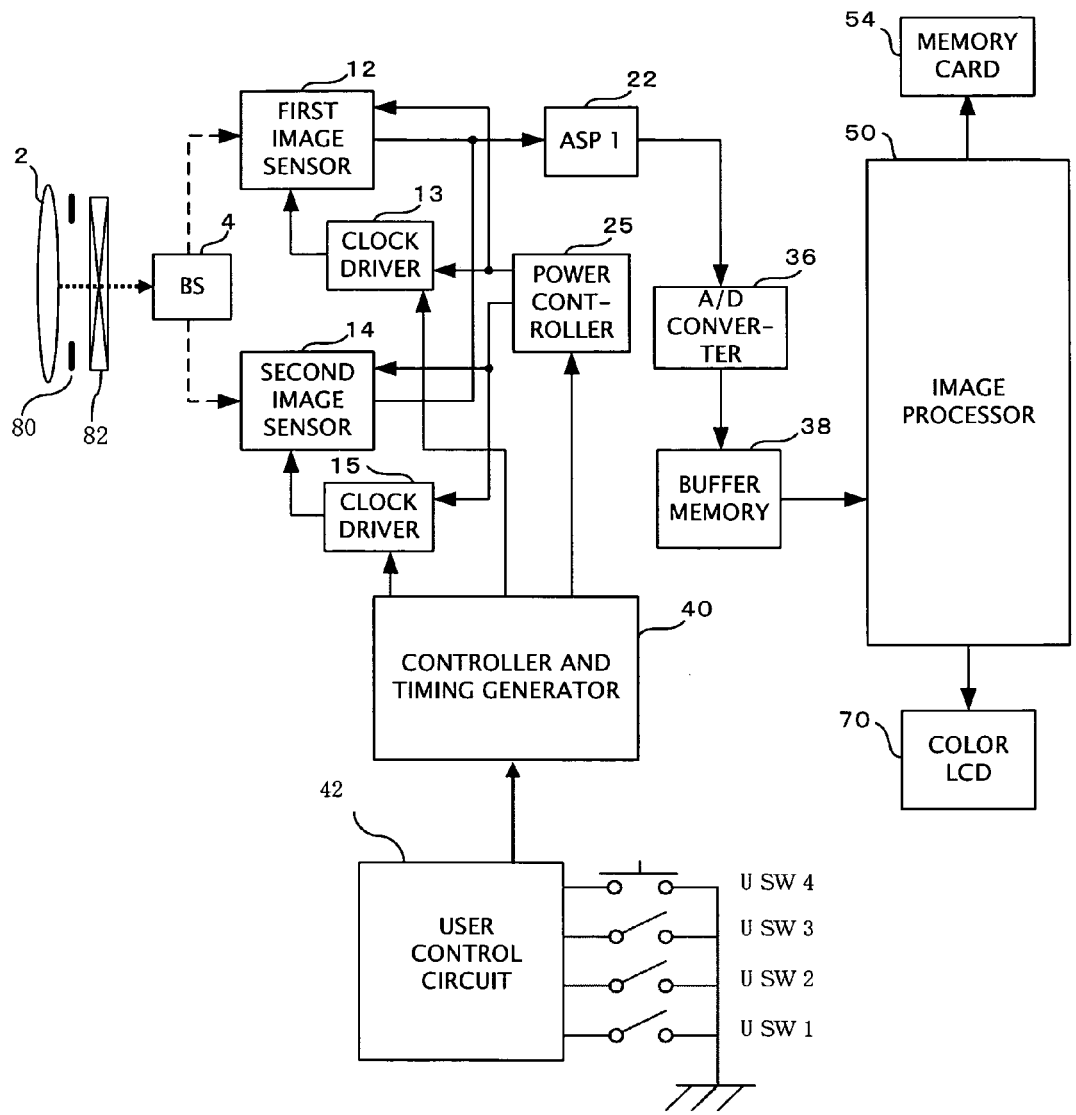
FIG. 3 is an entire block diagram of the digital camera having two image sensors.

FIG. 3 shows a detailed configuration of the digital camera shown in FIG. 1. The digital camera is a portable, battery-driven camera. The digital camera generates a stationary (still) digital image to be stored in a removable memory card 54. In addition to generating a still image, the digital camera may alternatively generate a still image and a moving digital image, and the moving digital image is also stored in the memory card 54.

The digital camera includes an image-capturing assembly. The image-capturing assembly comprises the fixed focal length lens 2; the beam splitter 4; the first image sensor 12; and the second image sensor 14. The first image sensor 12 is driven by a clock driver 13, and the second image sensor 14 is driven by a clock driver 15. This is a case where the image sensors 12, 14 are driven by the separate drivers 13, 15. The image-capturing assembly provides a first image output from the first image sensor 12 and a second image output from the second image sensor 14. The image sensors 12, 14 have the same number of pixels; differ from each other in terms of an image size; and are each formed from a CCD or a CMOS. The image sensors 12, 14 are single-chip color megapixel CCD sensors and have a known Bayer color filter used for capturing a color image.

The fixed focal length lens 2 has an aperture 80 used for controlling the amount of light exposure to which the image sensors 12, 14 have been subjected; and a shutter 82. In order to make their functions clear, the aperture 80 and the shutter 82 are separately provided. However, both the function of the aperture and the function of the shutter may also be integrated into a single element. In the present embodiment, one aperture is provided for the plurality of image sensors 12, 14. However, at least one shutter may be provided for use in capturing a still image, or a shutter may also be provided for each of the image sensors 12, 14. The shutter is generally actuated or used during capture of a still image. When the shutter does not double as the aperture, the shutter is left open at all times during capture of a moving image. Techniques widely practiced in the field of a digital camera include combination of pixel skipping, pixel addition, and the like, during capture of a moving image, to thus attain a high frame rate but a low resolution; and independent reading of all pixels during capture of a still image to thus achieve a low frame rate but a high-definition, high-resolution image. During the course of reading of a high-definition, high-resolution still image, the shutter is closed so as to avoid the influence of a smear, or the like, which is inevitable in the CCD. Although the present embodiment is not limited to either capture of a moving image or capture of a still image, descriptions are provided by means of taking, as an example, a case where frames are continually output with the shutter being left open during capture of a moving image.

A controller and timing generator 40 supplies the clock driver 13 with a signal to thus control the first image sensor 12; and supplies the clock driver 15 with a signal to thus control the second image sensor 14. A user control circuit 42 is used for controlling operation of the digital camera. A power control 25 controls a power source for the drivers 13, 15. An analogue signal output from the first image sensor 12 and an analogue signal output from the second image sensor 14 are amplified while being subjected to processing, such as correlated double sampling, in an analogue signal processor (ASP 1) 22. After having been converted into digital signals by an analogue-to-digital (A/D) converter 36, the thus-amplified signals are stored in DRAM buffer memory 38 and, further, processed by an image processor 50. Processing performed by the image processor 50 is controlled by firmware stored in a firmware memory formed from flash EPROM memory.

The digital image file processed by the image processor 50 is stored in the removable memory card 54. The memory card 54 is one type of digital image storage medium and can be utilized for several different physical formats. The memory card 54 can be applied to known formats; e.g., a compact flash (registered trademark) format; a smart medium format; a memory stick format; an MMC format; an SD format; and an XD memory card format. The memory card 54 can also be used for other formats; for instance, a magnetic hard drive, a magnetic tape, an optical disk, and the like. Alternatively, built-in nonvolatile memory, such as flash EPROM or the like, may also be used for the digital camera. In such a case, the necessity of the memory card 54 is obviated.

The image processor 50 performs various housekeeping functions and image processing functions. The functions include color interpolation utilizing color and tone compensation in order to generate sRGB image data. The sRGB image data are then subjected to JPEG compression, and the thus-compressed data are stored as JPEG image data in the memory card 54. The sRGB image data can also be supplied to a host PC via a host interface, such as a SCSI connection, a USB connection, a FireWire connection, or the like. A so-called Exif image format is used for a JPEG file.

The image processor 50 is typically a programmable image processor, but may also be embodied by combination of a hard-wired custom integrated circuit processor, a general-purpose microprocessor, a hard-wired custom IC, and a programmable processor.

The image processor 50 generates low-resolution thumbnail images, as well. After capture of a thumbnail image, the thumbnail image is displayed on a color LCD 70. The graphical user interface displayed on the color LCD 70 is controlled by the user control circuit 42. The user control circuit 42 comprises a release button, various mode setting buttons, and a zoom switch. FIG. 3 illustrates four switches USW 1 to USW 4. The switch USW 1 is for selecting whether to activate the lens 2 as a fixed focal length lens or a variable focal length lens. The switch USW 2 is for switching the mode of zooming operation. Any one is selected from modes (A) to (C), which will be described later, by means of switching action of the switch USW 2. The switch USW 3 is for selecting an image sensor which performs image-capturing operation. In response to switching action of the switch USW 3, switching among drive circuits of the plurality of image sensors or switching among output images is performed, whereby a plurality of images having different angles of view can be selected instantaneously. The USW 4 is a so-called zoom switch for continually changing the angle of view among the image sensors by means of electronic zooming operation when the lens 2 is the fixed focal length lens. By means of actuation of the USW 4, an angle-of-view change position is arbitrarily, manually set. In such a switching structure, when the variable focal length lens has been selected by means of the switch USW 1, any one can be selected from the below by means of actuation of the switch USW 2.

(A) A mode of continually changing the angle of view through optical zooming action by means of actuation of the switch USW 4; automatically switching an image-capturing element to the next image-capturing element when the telephotography end or the wide end has been reached; continually changing the angle of view by means of optical zooming action; and continually changing the angle of view from a location—where the endmost telephotography side has been reached—through electronic zooming action until a predetermined angle of view is attained.

(B) A mode of continually changing the angle of view through optical zooming action by means of actuation of the switch USW 4 through use of an image-capturing element arbitrarily selected by the switch USW 3.

(C) A mode of resetting the variable focal length lens to a wide end by means of actuation of the switch USW 4, and continually changing the angle of view through electronic zooming action.

Figure 4:
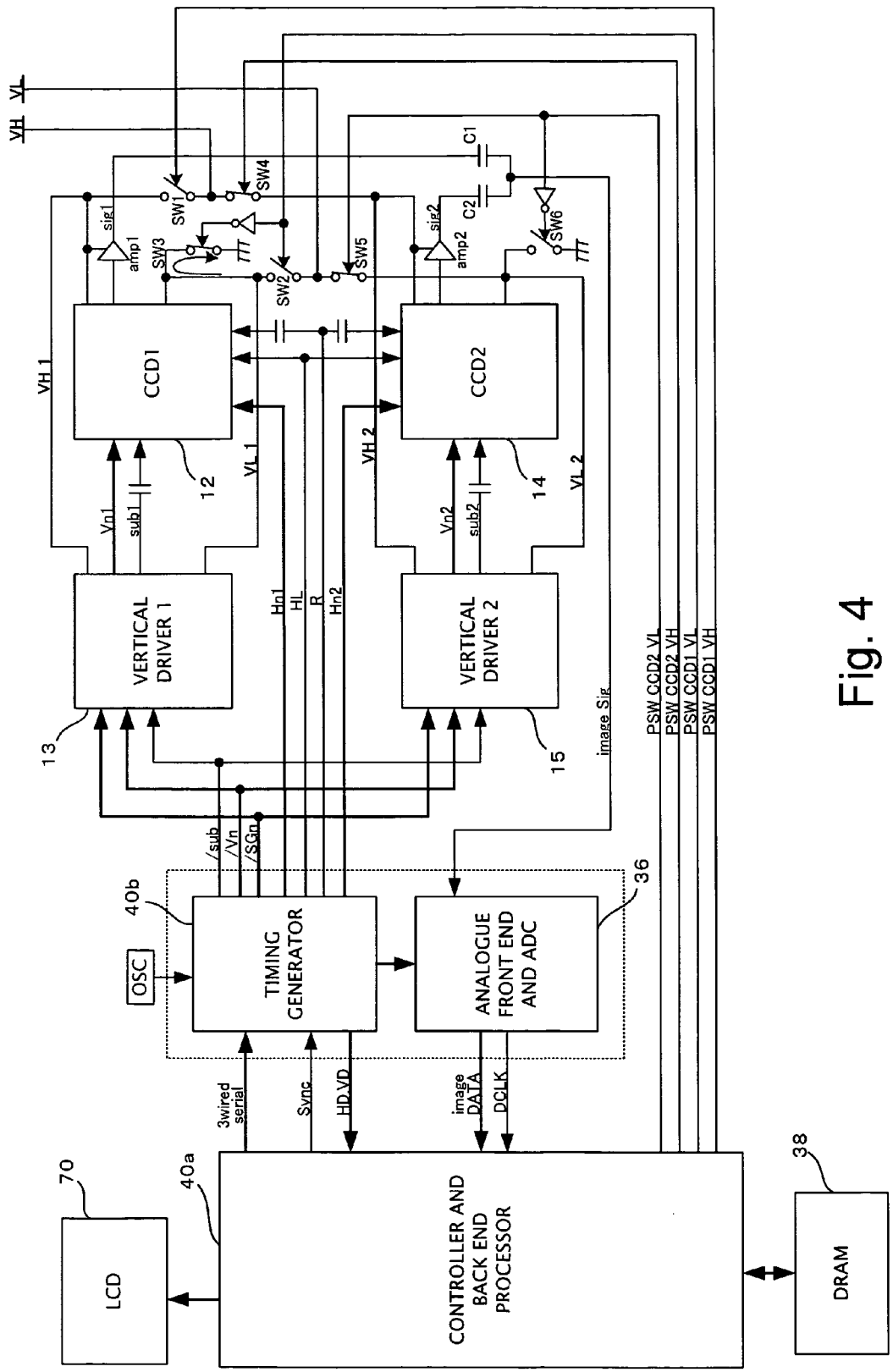
FIG. 4 is a drive circuit diagram of the digital camera having two image sensors.

FIG. 4 shows a more detailed configuration of the digital camera. The controller and timing generator 40 is shown while being divided into a controller 40a and a timing generator 40b. The clock driver 13 is shown as a vertical driver 13, and the clock driver 15 is shown as a vertical driver 15.

Each of the first image sensor (CCD 1) 12 and the second image sensor 14 (CCD 2) is driven by a horizontal transfer clock signal (a horizontal transfer drive signal) Hn and a vertical transfer clock signal (a vertical transfer drive signal) V, and transfers and outputs accumulated electric charges. The horizontal transfer drive signal is supplied from a timing generator 40b to the first image sensor 12 and the second image sensor 14, and the vertical transfer drive signal is supplied from the vertical drivers 13, 15. Specifically, the timing generator 40b supplies the first image sensor 12 with a horizontal transfer drive signal Hn1, and supplies the second image sensor 14 with the horizontal transfer drive signal Hn2. In addition, the timing generator 40b supplies each of the first image sensor 12 and the second image sensor 14 with a horizontal transfer path final stage drive signal HL and a reset pulse R. A low-load drive signal in the horizontal driver system is shared between the first image sensor 12 and the second image sensor 14. The timing generator 40b supplies each of the vertical drivers 13, 15 with a vertical transfer drive signal Vn. The vertical driver 13 supplies the first image sensor 12 with a vertical transfer drive signal Vn1. The vertical driver 15 supplies the second image sensor 14 with a vertical transfer drive signal Vn2.

An image signal sig1 read from the first image sensor 12 is amplified by an amplifier amp1 (i.e., amplification with a gain of 1.0; the amplifier substantially acts as a buffer or an impedance converter), and the thus-amplified signal is supplied to a capacitor C1. Meanwhile, an image signal sig2 read from the second image sensor 14 is amplified by an amp2 (i.e., amplification with a gain of 1.0; the amplifier substantially acts as a buffer or an impedance converter), and the thus-amplified signal is supplied to a capacitor C2. The other end of the capacitor C1 and the other end of the capacitor C2 are connected in common, and the first image sensor 12 and the capacitor C1 are connected in shunt with the second image sensor 14 and the capacitor C2. An output from the capacitor C1 and an output from the capacitor C2 are supplied to an analogue front-end (AFE) and analogue-to-digital (A/D) converter 36 disposed in a subsequent stage. The AFE and A/D converter 36 corresponds to the ASP 22 and the A/D converter 36, which are shown in FIG. 3. Each of the amplifiers amp1 and amp2 is an emitter follower formed from bipolar transistors. A base terminal (supplied with an image signal from an image sensor) of the emitter follower is taken as an input terminal, and an emitter terminal of the emitter follower is taken as an output terminal. Further, a collector terminal of the emitter follower is connected to the power source. When the collector power source is deactivated, the amplifiers amp1 and amp2 has high impedance.

Figure 24:
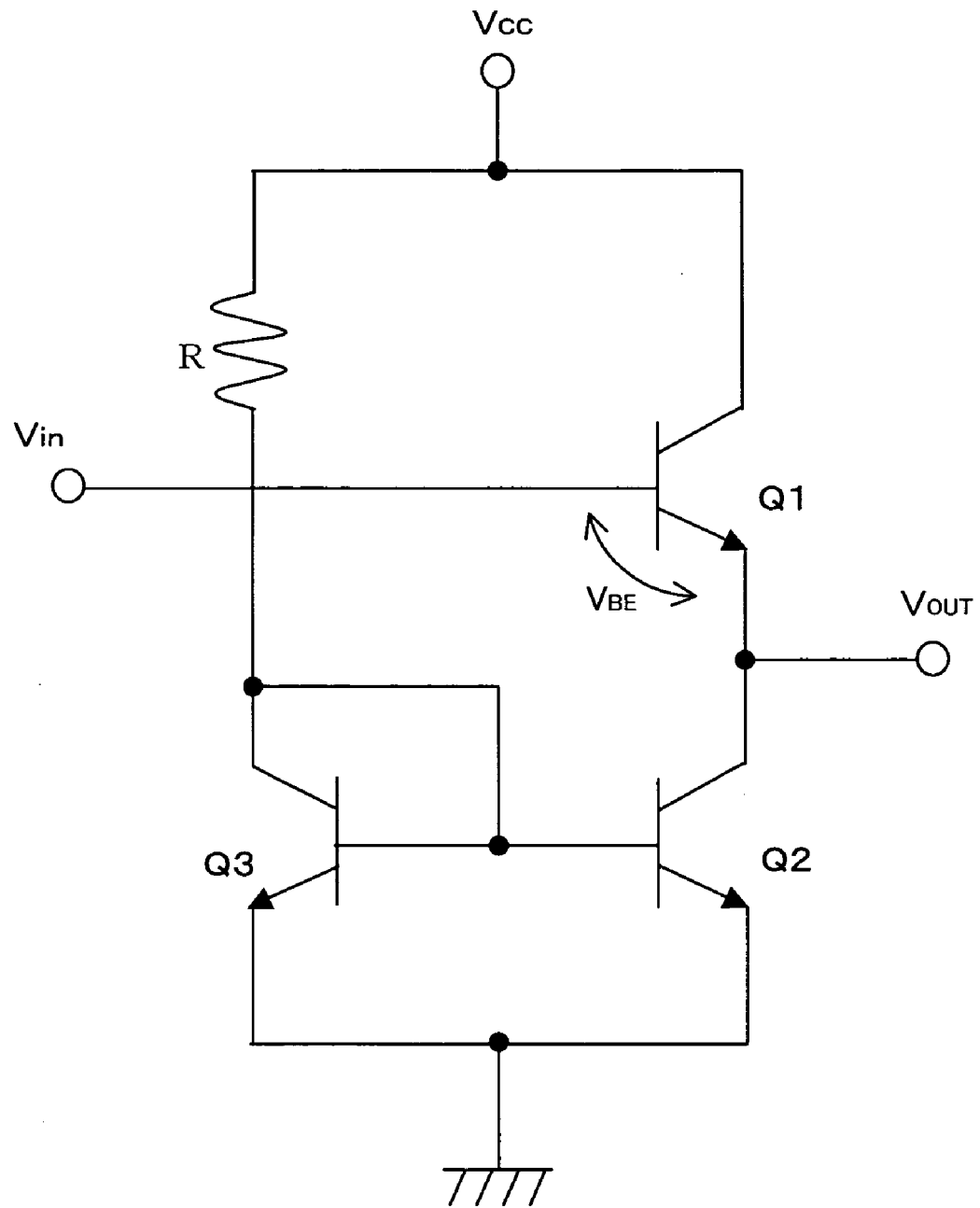
FIG. 24 is a circuit diagram of an amplifier.

FIG. 24 shows an example emitter follower constituting each of the amplifiers amp1, amp2. A bipolar transistor Q3 connected directly to a resistor R and a bipolar transistor Q2 constitute a constant current load, and the load is connected to a bipolar transistor Q1. The collector power source Vcc is connected to the resistor R and a collector of the transistor. When a signal is applied to an input terminal Vin, a signal—which is lower than Vcc by an amount corresponding to a voltage $V_{BE}$ appearing between the base and the emitter of the transistor Q1—is output to an output terminal Vout. In operation, the emitter follower operates as an amplifier having a voltage gain of one. However, when the collector power Vcc is deactivated, the transistor Q2 becomes deactivated, so that output impedance of the output terminal Vout becomes essentially infinite. Although each of the amplifiers is configured as an emitter follower using bipolar transistors, a similar advantage can be yielded even when the amplifier is formed from a source follower using FETs. Consequently, when the collector power source of the amp2 is deactivated, the image signal sig1 is supplied to the AFE and the A/D converter 36 via the capacitor C1. When the collector power source of the amp1 is deactivated, the image signal sig2 is supplied to the AFE and the A/D converter 36 via the capacitor C2. As mentioned above, an output of an image signal can be switched without use of an analogue switch. A common MOS-type analogue switch poses problems; namely, generation of noise such as thermal noise or 1/f noise, and a failure to accurately transmit a signal with high on-resistance. Moreover, a so-called video switch of bipolar type poses problems; namely, a complicated configuration, heavy power consumption, high cost, and the like. In the present embodiment, an image signal is output in a switched manner without use of such an analogue switch, and hence cost cutting as well as noise reduction can be achieved.

The first image sensor 12 is connected to a positive power source VH via a switch SW1 as well as to a negative power source VL via a switch SW2. Further, the vertical driver 13 is also connected to the positive power source VH via the switch SW1 by means of a VH1 power source line as well as to the negative power source VL via the switch SW2 by means of a power source line VL1. Meanwhile, the second image sensor 14 is connected to the positive power source VH via a switch SW4 as well as to the negative power source VL via a switch SW5. Further, the vertical driver 15 is also connected to the positive power source VH via the switch SW4 by means of a VH2 power source line as well as to the negative power source VL via the switch SW5 by means of a power source line VL2. The switches SW1 and SW4 are connected in series with each other, and a power source line of the positive power source VH is connected to a node between the switches SW1 and SW4. The switches SW2 and SW5 are connected in series with each other, and a power source line of the negative power source VL is connected to a node between the switches SW2 and SW5. Each of the switches SW1, SW2, SW4, and SW5 is formed from a switching transistor. Activation or deactivation of the switches SW1, SW2, SW4, and SW5 is controlled by a power switch control signal PSW supplied from the controller 40a. The controller 40a supplies a signal PSWCCD1VH to the switch SW1, as well as supplying a signal PSWCCD1VL to the switch SW2. When both the switches SW1 and SW2 are subjected to activation control, power is supplied to the first image sensor 12 and the vertical driver 13, so that the image signal generated by the first image sensor 12 is output from the first image sensor 12. The controller 40a supplies a signal PSWCCD2VH to the switch SW4, as well as supplying a signal PSWCCD2VL to the switch SW5.

When both the switches SW4 and SW5 are subjected to activation control, power is supplied to the second image sensor 14 and the vertical driver 15, so that the image signal generated by the second image sensor 14 is output from the second image sensor 14. The controller 40a supplies these control signals PSWCCD1VH to PSWCCD2L to the respective switches, thereby controlling the operating state, inoperative state, power-supplied state, and power-blocked state of each of the first image sensor 12, the vertical driver 13, the second image sensor 14, and the vertical driver 15. Consequently, the controller 40a acts also as the power supply control 25 shown in FIG. 3. The controller 40a supplies the respective switches with the control signals PSWCCD1VH to PSWCCD2VL in accordance with a zoom position set by the user.

When the zoom position is set on the wide side or the part of the first image sensor 12, the switches SW1 and SW2 are subjected to activation control, to thus supply the first image sensor 12 and the vertical driver 13 with power and bring them into an operating state. When the zoom position is set on the telephotograph side or the part of the second image sensor 14, the switches SW1 and SW2 are controlled so as to be deactivated. Instead, the switches SW4 and SW5 are subjected to activation control, and power is supplied to the second image sensor and the vertical driver 15, to thus bring them into an operative state. The image signals sig1 and sig2 are converted into digital image signals by means of the AFE and the A/D converter 36, and the thus-converted signals are supplied to the controller 40a. The controller 40a stores the digital image signals into the DRAM 38 serving as the buffer memory 38. In addition to being used as program memory, the DRAM 38 is used also as a video memory, or so-called VRAM, thereby absorbing asynchronous operation existing between a display system (an LCD) and an image-capturing system (CCD). The timing generator 40b and the AFE and A/D converter 36 can be packaged into a single chip.

The first image sensor 12 is further grounded via a switch SW3, and the second image sensor 14 is further grounded via a switch SW6. These switches are discharge switches for increasing the speed of deactivation of the negative electrode VL of the image sensors and the speed of switching between the image sensors. When the first image sensor 12 is not selected, the switch SW3 is subjected to activation control, thereby immediately discharging electric charges stored in the first image sensor 12 to thus prepare for the next selection operation. When the second image sensor 14 is not selected, the switch SW6 is subjected to activation control to thus immediately discharge the electric charges accumulated in the second image sensor 14, thereby preparing for the next selection operation. Activation or deactivation of these switches SW3 and SW6 is also controlled by the controller 40a. Specifically, the control signal PSWCCD1VL output from the controller 40a is supplied to the switch SW3 after having been logically inverted by an inverter. After having been logically inverted by an inverter, the control signal PSWCCD1VL output from the controller 40a is supplied to the switch SW3. After having been logically inverted by the inverter, the control signal PSWCCD2VL output from the controller 40a is supplied to the switch SW6. Consequently, in relation to the first image sensor 12, the switch SW3 is subjected to activation control when the switch SW2 is being subjected to deactivation control, thereby discharging accumulated electric charges. In relation to the second image sensor 14, the switch SW6 is subjected to activation control when the switch SW5 is being subjected to deactivation control, thereby discharging accumulated electric charge.

Figure 5:
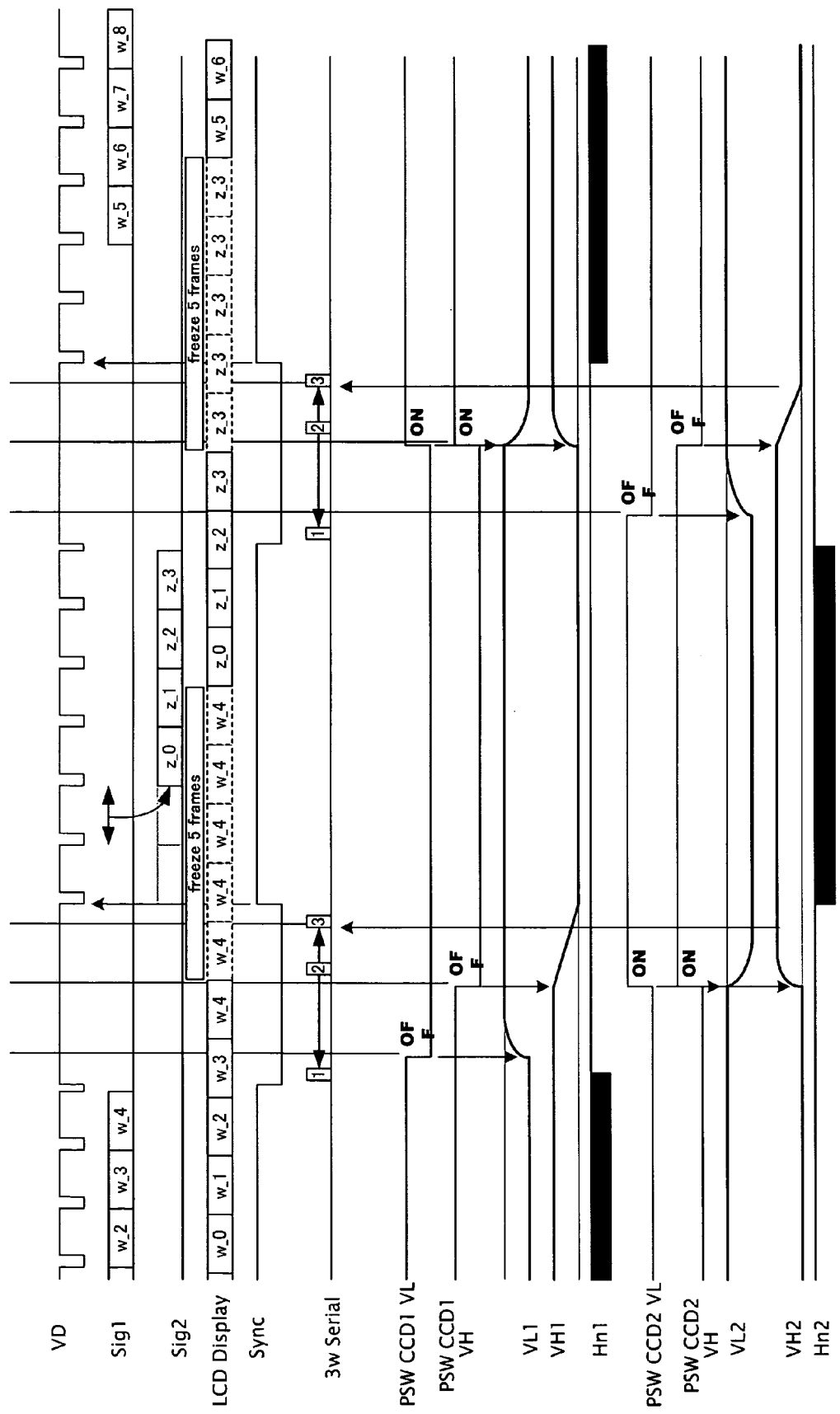
FIG. 5 is a timing chart (part 1) of the digital camera having two image sensors.

FIG. 5 shows a timing chart for the configuration shown in FIG. 4. When the zoom position is set on the wide side or the part of the first image sensor 12, the timing generator 40b supplies the first image sensor 12 with the horizontal transfer drive signal Hn1, and the vertical driver 13 supplies the first image sensor 12 with the vertical transfer drive signal Vn1. As a result, image signals sig1 pertaining to images w2, w3, w4, . . . are sequentially output from the first image sensor 12 in synchronism with a vertical synch signal VD. Here, the reference symbol "w" denotes "wide" in consideration that an image formed by the first image sensor 12 is a wide-side image. The images w2, w3, and w4 are sequentially displayed on the color LCD 70. When the user has moved the zoom position from the wide end to the threshold zoom position, the signal PSWCCD1VL shifts from the active state to the inactive state, and the signal PSWCCD1VH subsequently shifts from the active state to the inactivate state. When the signal PSWCCD1VL is controlled to the inactive state, the switch SW3 is subjected to activation control. The electric potential of the VL1 line increases by means of high-speed electric discharge. Meanwhile, the electric potential of the VH1 line gradually decreases because of the inactive state of the signal PSWCCD1VH. As a result, the supply of power to the first image sensor 12 and the vertical driver 13 is interrupted. In synchronism with the timing when the signal PSWCCD1VH shifts from the active state to the inactive state, the signals PSWCCD2VL and PSWCCD2VH shift from the inactive state to the active state. As a result, the electric potential of the VL2 line decreases, and the electric potential of the VH2 line increases, so that power is supplied to the second image sensor 14 and the vertical driver 15. When the first image sensor 12 is switched to the second image sensor 14, a synchronous signal Sync is forcefully brought to a low level.

Subsequently, the synchronous signal is forcefully brought to a high level, to thus effect synchronization. In synchronism with the timing of the high level of the synchronous signal Sync, reading of the second image sensor 14 is commenced. The horizontal transfer drive signal Hn2 is supplied to the second image sensor 14, and the vertical transfer drive signal Vn2 is supplied to the second image sensor 14 from the vertical driver 15. Subsequently, image signals sig2 pertaining to images z0, z1, z2, . . . are sequentially output from the second image sensor 14 in synchronism with the vertical synchronous signal VD. Reference symbol "z" denotes "zoom" in consideration that an image formed by the second image sensor 14 is a telephotograph-side image. A finite time is required from display of the image w4 of the first image sensor 12 until display of the image z0 of the second image sensor 14. The processor 40a keeps displaying (freezes) the image w4 on the LCD 70 from display of the image w4 until display of the image z0. Specifically, the processor 40a repeatedly reads the image w4 stored in the DRAM 38, and keeps displaying the thus-read image w4 on the LCD 70. In the drawing, a time consumed by five frames is required until the image z0 is displayed on the LCD, and hence the image w4 is frozen for a period of time corresponding to five frames. 3wserial corresponds to a serial signal for three wires, and the signals are supplied from the controller 40a to the timing generator 40b. The serial signal assumes three status values. Namely, "1" means that the CCD enters a standby state; "2" means that the CCD is set (in relation to a gain for the CCD, an electronic shutter, and the like); and "3" means that the CCD is released from the standby condition and that an image signal is output. When "1" of the signal 3wserial is input, the timing generator 40b brings the first image sensor 12 into a standby condition. Subsequently, when "2" of the signal 3wserial is input, the gain of the second image sensor 14 is adjusted on the basis of data output from the metering sensor. When "3" is input at a point in time the electric potential of the VH2 line and that of the VL2 line have become stable, the first image sensor 12 is released from the standby state.

FIG. 5 shows an operation timing chart employed when the user has moved the zoom position from the telephotography side to the wide side. When the user has moved the zoom position from the telephotography side to the threshold zoom position, the signals PSWCCD2VL and PSWCCD2VH are sequentially controlled from the active state to the inactive state, thereby interrupting the supply of power to the second image sensor 14 and the vertical driver 15. Moreover, the signals PSWCCD1VL and PSWCCD1VH are controlled from the inactive state to the active state in synchronism with the timing when the signal PSWCCD2VH is controlled from the active state to the inactive state, thereby supplying power to the first image sensor 12 and the vertical driver 13. Subsequently, the horizontal transfer drive signal Hn1 is supplied to the first image sensor 12, thereby reading an image signal from the first image sensor 12. Since switching the second image sensor 14 to the first image sensor 12 requires consumption of a time, the final image z3 of the second image sensor 14 is frozen for a period of time corresponding to five frames. Subsequently, the image w5 from the first image sensor 12 is displayed on the LCD 70.

Figure 6:
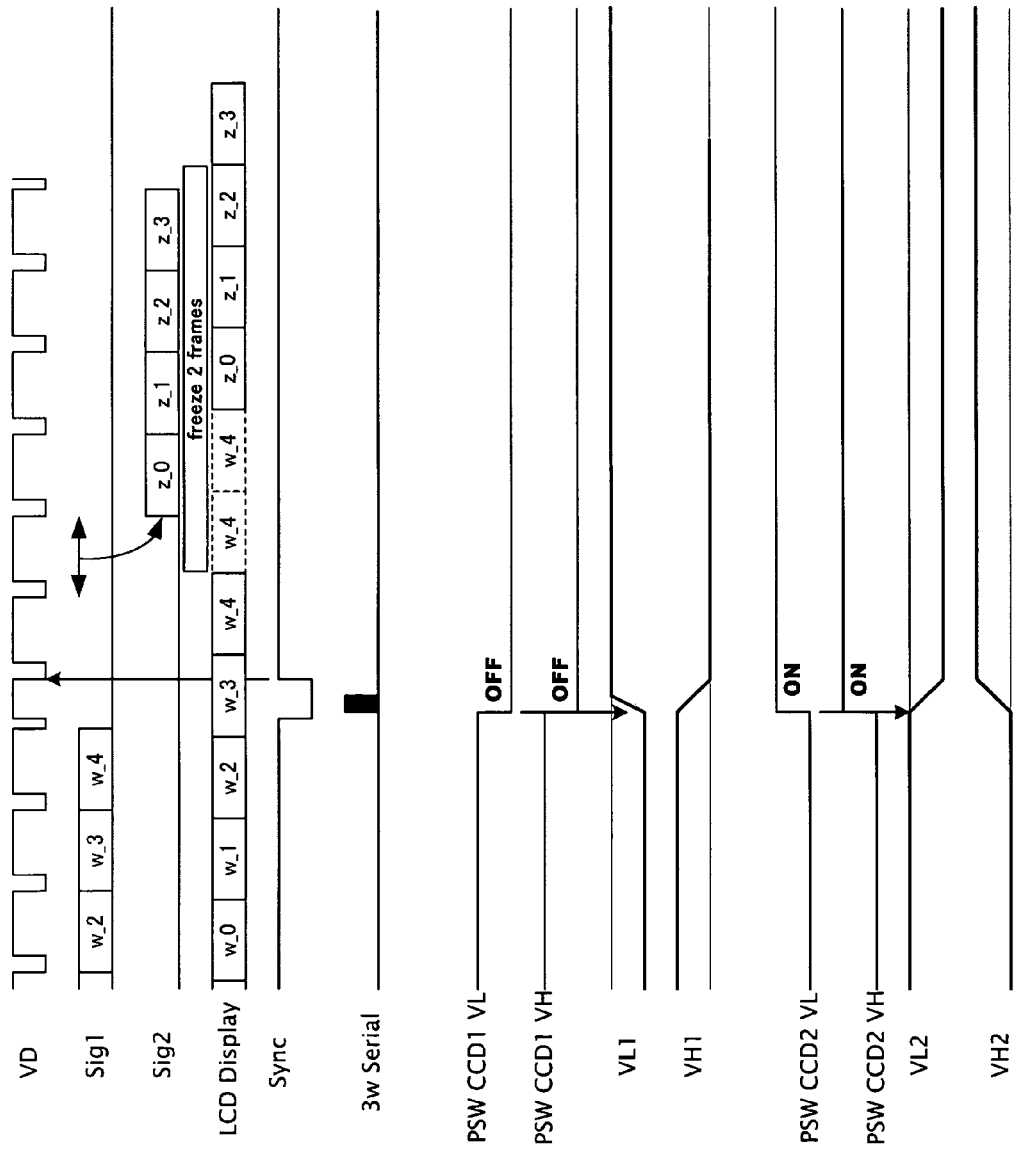
FIG. 6 is a timing chart (part 2) of the digital camera having two image sensors.

FIG. 6 shows another operation timing chart. When the zoom position has moved to the threshold zoom position, the signals PSWCCD1VL and PSWCCD1VH simultaneously shift from the active state to the inactive state. In synchronism with this timing, the signals PSWCCD2VL and PSWCCD2VH shift from the inactive state to the active state. Setting of the CCD is performed by means of the signal 3Wserial, and the synchronous signal Sync is forcefully generated, to thus switch the first image sensor 12 to the second image sensor 14. The final image w4 is frozen from the final image w4 of the first image sensor 12 to the first image z0 of the second image sensor 14. In the drawing, the image w4 is frozen for a period of time corresponding to two frames.

As mentioned above, the two image sensors 12, 14 are actuated in a switching manner, whereby a wide image and a telephotographic image can be acquired. When the fixed-focal-length lens 2 is used as the lens 2, switched driving of the image sensors 12, 14 is controlled, and zooming action is performed by means of only electronic zooming operation. Hence, when compared with the case where the zoom lens is used, a zoom rate can be enhanced. Since a zoom motor is not present, there is also yielded an advantage of obviating the necessity for countermeasures to noise of a zoom motor even when recording is performed along with capture of an image.

In the present embodiment, basically two image sensors are selectively driven. However, the drivers 13, 15 can also be driven simultaneously, to thus actuate the two image sensors 12, 14 concurrently. In this case, the wide image acquired by the first image sensor 12 and the telephotographic image acquired by the second image sensor 14 can be displayed on the LCD 70 in a superimposed manner.

Figure 7:
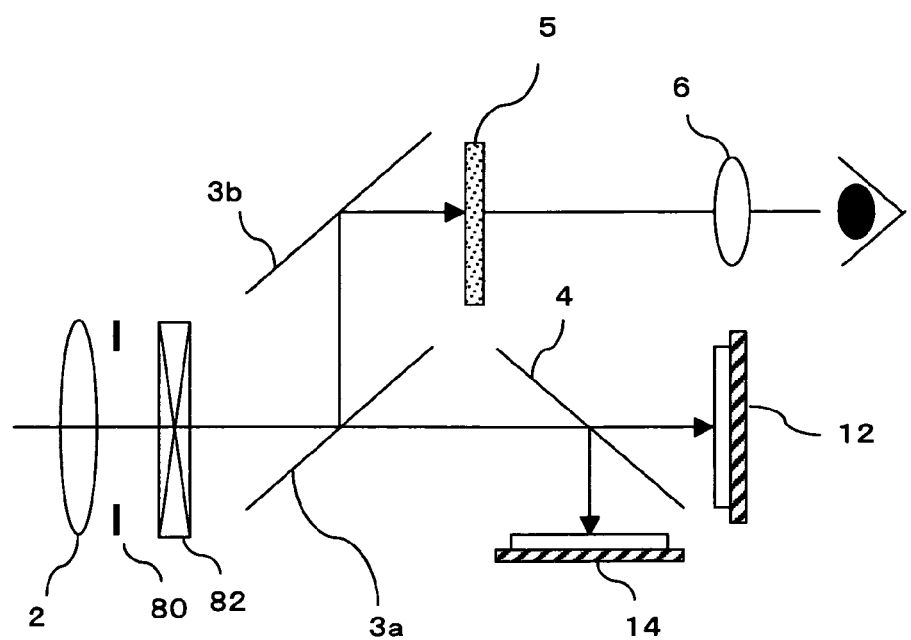
FIG. 7 is another conceptual block diagram of the digital camera having two image sensors.

In the present embodiment, a portion of the light originating from the lens 2 may also be guided in a split manner to a finder. FIG. 7 shows a conceptual configuration adopted in this case. A second beam splitter 3a and a third beam splitter 3b are interposed between the lens 2 and the beam splitter 4.

The user who projects on the screen 5 a portion of the light originating from the lens 2 visually ascertains an image of a subject via a finder lens 6.

<When the Digital Camera has Three Image Sensors>

Figure 8:
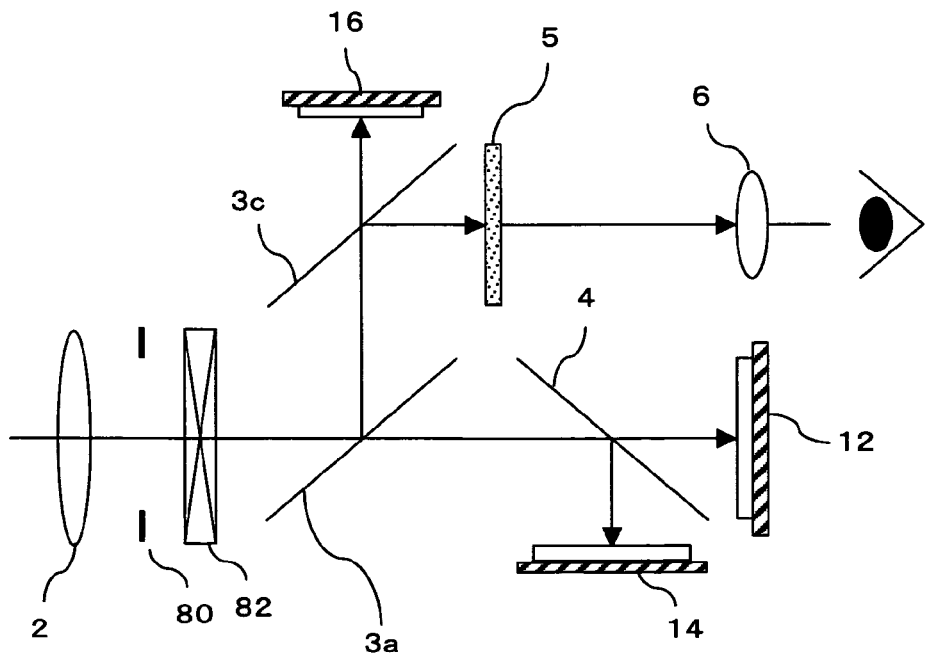
FIG. 8 is a conceptual block diagram of a digital camera having three image sensors.

FIG. 8 is a conceptual configuration of a digital camera of the present embodiment. The digital camera comprises the lens 2, the aperture 80, the shutter 82, three beam splitters 3a, 3c, and 4 for splitting light from the lens 2 into two beams, the two image sensors 12, 14 for receiving the light output from the beam splitter 4, and the image sensor 16 for receiving light from the beam splitter 3c. Specifically, light is first split into two beams by means of the beam splitter 3a. One beam is further split into two sub-beams by means of the beam splitter 4. The thus-split sub-beams enter the first image sensor 12 and the second image sensor 14. The remaining beam split by the beam splitter 3a is further split into two sub-beams by the beam splitter 3c. The thus-split sub-beams enter the third image sensor 16 and the screen 5. The first image sensor 12, the second image sensor 14, and the third image sensor 16 are equal to each other in terms of the number of pixels, but differ from each other in terms of an image size (a pixel size).

Specifically, there exists a relationship of the image size of the first image sensor 12>the image size of the second image sensor 14>the image size of the third image sensor 16. The lens 2 is a fixed-focal-length lens. The image sensors 12, 14, and 16 differ from each other in terms of an image size. Hence, angles of view acquired by the image sensors differ from each other. The first image sensor 12 has a relatively wide angle of view; the second image sensor 14 has an intermediate angle of view; and the third image sensor 16 has a relatively narrow angle of view. The first image sensor 12 can also be said to be able to acquire a wide image; the second image sensor 14 can also be said to be able to acquire an intermediate image; and the third image sensor 16 can also be said to be able to acquire a telephotographic image. Switching among the wide angle of view, the intermediate angle of view, and the narrow angle of view can be performed by means of appropriately switching the three image sensors 12, 14, and 16. Optical zooming action can also be realized even when the lens 2 is embodied as a fixed-focal-length lens. Switching among the wide angle of view, the intermediate angle of view, and the narrow angle of view can be performed by means of actuation of a zoom switch or actuation of a switch for toggling among the image sensors 12, 14, and 16. When switching among the wide angle of view, the intermediate angle of view, and the narrow angle of view is performed by means of actuation of the zoom switch, the first image sensor 12 is selected on the wide side; the second image sensor 14 is selected at the intermediate position; and the third image sensor 16 is selected on the telephotography side. The angle of view existing between the unique angle of view of the first image sensor 12 and the unique angle of view of the second image sensor 14 can be acquired through electronic zooming action for electronically enlarging an image signal obtained by the first image sensor 12. The angle of view existing between the unique angle of view of the second image sensor 14 and the unique angle of view of the third image sensor 16 can be acquired through electronic zooming action for electronically enlarging an image signal obtained by the second image sensor 14. When the zoom switch is actuated sequentially from the wide side to the telephotography side, the wide image acquired by the first image sensor 12 is first obtained, and an electronically zoomed image of the first image sensor 12 is sequentially acquired in response to actuation of the zoom switch. When the unique angle of view of the second image sensor 14 has been attained, the first image sensor 12 is switched to the second image sensor 14, whereby the intermediate image of the second image sensor 14 is output. When the zoom switch is further actuated sequentially from the wide side to the telephotography side, electronically zoomed images of the second image sensor 14 are sequentially acquired. When the unique angle of view of the third image sensor 16 has been attained, the second image sensor 14 is switched to the third image sensor 16, whereby the telephotographic image of the third image sensor 16 is output. A threshold position (a first threshold position) where the first image sensor 12 is switched to the second image sensor 14 may be set to a position closer to the telephotography side than to the unique angle of view as well as to the unique angle of view of the second image sensor 14. When an electronic zooming range of an image acquired by the second image sensor 14 is assumed to be a range in which the angle of view is altered, the threshold position is arbitrarily set within the range where the angle of view of the second image sensor 14 is altered. An image or an electronically-zoomed image, which is acquired at the unique angle of view of the first image sensor 12, is output at a position closer to the wide side than to the threshold position. An image or an electronically-zoomed image, which is acquired at the unique angle of view of the second image sensor 14, is output at a position closer to the telephotography position than to the threshold position. The electronically zoomed image is inferior in image quality, and hence the threshold position is preferably set to the position of the unique angle of view of the second image sensor 14. The same also applies to a threshold position (a second threshold position) where the second image sensor 14 is switched to the third image sensor 16.

Even in the present embodiment, the image sensors 12, 14, and 16 differ in size from each other and hence have different sensitivities. There is a necessity for adjusting the sensitivities of the image sensors 12, 14, and 16 so as to become identical with each other. For instance, differences among the sensitivities are compensated by means of adjusting transmission factors of the beam splitters 3a, 3c, and 4 in accordance with the sensitivities of the respective image sensors 12, 14, and 16 by use of Method (1). Sensitivities become higher in sequence of the first image sensor 12>the second image sensor 14>the third image sensor 16. In order to compensate for the differences, the transmission factors of the beam splitters 3a, 3c, and 4 are adjusted. The differences among the sensitivities may also be compensated by combination of any methods of (1) to (4); for example, a combination of adjustment of the transmission factors of the beam splitter 3a, 3c, and 4 with adjustment of gains of the respective image sensors 12, 14, and 16. There is a potential risk of adjustment of gains posing a problem of an increase in noise. However, an increase in noise can be prevented by means of adjusting both the transmission factors and the gains to thus reduce the degree of adjustment of only gains.

Since the image sensors 12, 14, and 16 are identical with each other in terms of the number of pixels, at least two drives of the image sensors 12, 14, and 16 can also be shared, in contrast to each of the image sensors 12, 14, and 16 being provided with a driver, thereby enabling simplification of the configuration of the digital camera. When the drivers are shared, switching is sequentially effected from the first image sensor 12 to the second image sensor 14, and from the second image sensor 14 to the third image sensor 16, in response to zooming operation. Hence, the first image sensor 12 and the third image sensor 16 are hardly driven simultaneously. Therefore, sharing a driver for the first image sensor 12 and a driver for the third image sensor 16 is preferable. As a matter of course, the three image sensors 12, 14, and 16 can also be driven by means of a single driver.

Figure 9:
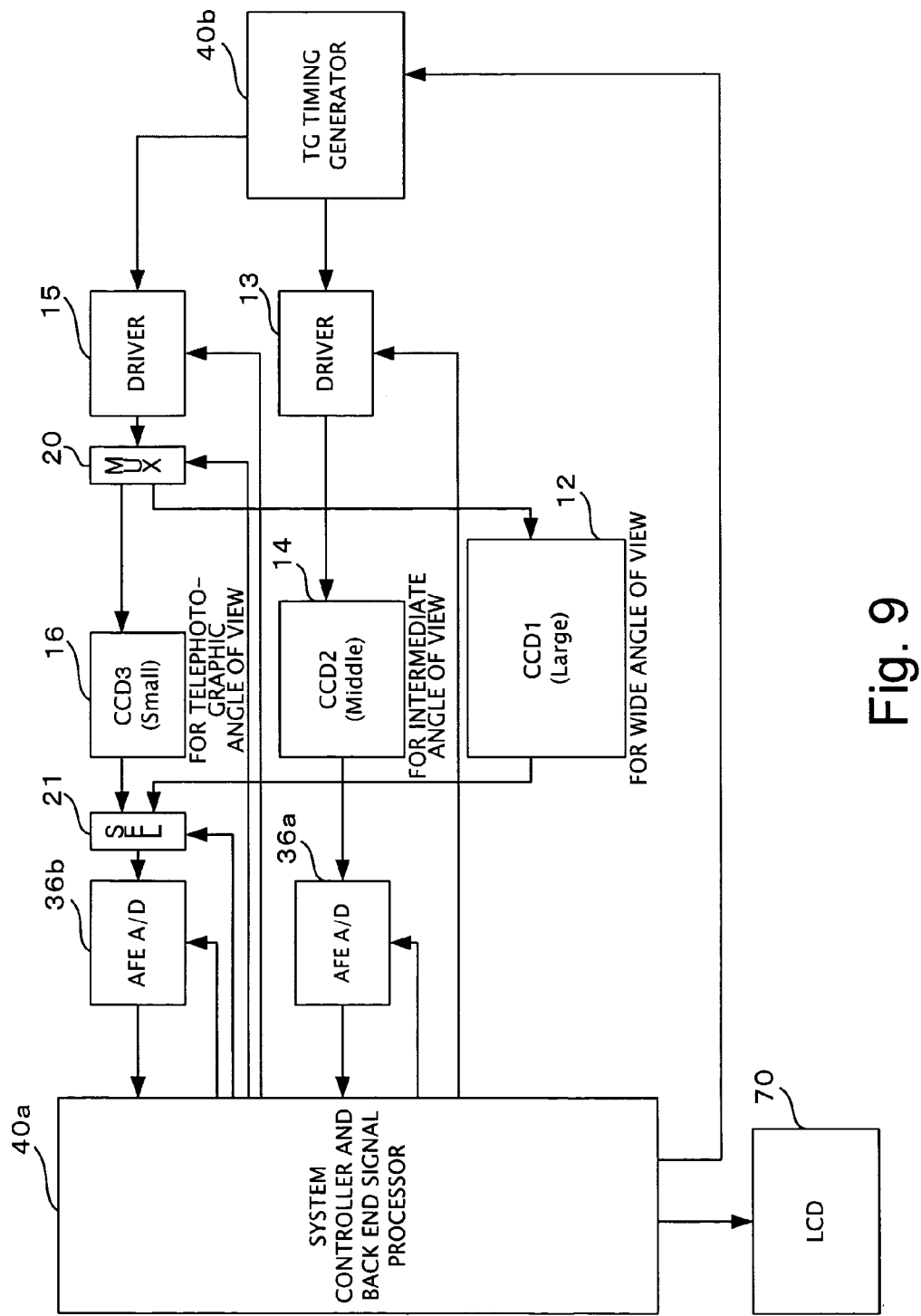
FIG. 9 is a drive circuit diagram of the digital camera having three image sensors.

FIG. 9 shows a detailed configuration of a drive circuit of the digital camera shown in FIG. 8. In the configuration, the first image sensor 12 and the third image sensor 16 share a driver. Specifically, the first image sensor 12 (for a wide image) and the third image sensor 16 (for telephotographic image) are driven by the driver 13, and the second image sensor 14 (for an intermediate image) is driven by the driver 15. The drivers 13 and 15 are supplied with a timing signal from the timing generator 40b. The driver 13 generates a drive signal through use of a timing signal, and supplies the second image sensor 14 with the drive signal. The driver 15 generates a drive signal through use of the timing signal, and supplies a multiplexer MUX 20 with the drive signal. The multiplexer MUX 20 outputs the drive signal to either the first image sensor 12 or the third image sensor 16 by means of a switching signal from the system controller and back end processor 40a. The outputs from the first image sensor 12 and the third image sensor 16 are supplied to the selector 21. In accordance with a signal from the system controller and back end processor 40a, the selector 21 switches between the output from the first image sensor 12 and the output from the third image sensor 16, and supplies the thus-switched output to an analogue front end AFE and A/D converter 36b. Meanwhile, an output from the second image sensor 14 is supplied directly to (without passing through a selector) an analogue front end AFE and A/D converter 36a. Image signals converted into digital signals by the AFE and A/D converters 36a and 36b are supplied to the system controller and back end processor 40a, where the signals are processed, and the thus-processed images are displayed on the LCD 70. Since the second image sensor 14 is independently driven by the driver 13, the first image sensor 12 and the second image sensor 14 can be simultaneously driven, or the second image sensor 14 and the third image sensor 16 can be driven simultaneously. Consequently, the wide image acquired by the first image sensor 12 and the intermediate image acquired by the second image sensor 14 can be simultaneously captured, displayed, and recorded. When the wide image of the first image sensor 12 is captured, a focus position (a contrast detection method, or the like) can also be detected by use of the intermediate image obtained by the second image sensor 14.

An intermediate image acquired by the second image sensor 14 is preferably used for detecting the focus position of an area—covered by the intermediate image of the second image sensor 14—in the wide image acquired by the first image sensor 12; for instance, the center of the wide image. The wide image of the first image sensor 12 is preferably used for detecting the focus position of the other area (i.e., a peripheral area).

Figure 10:
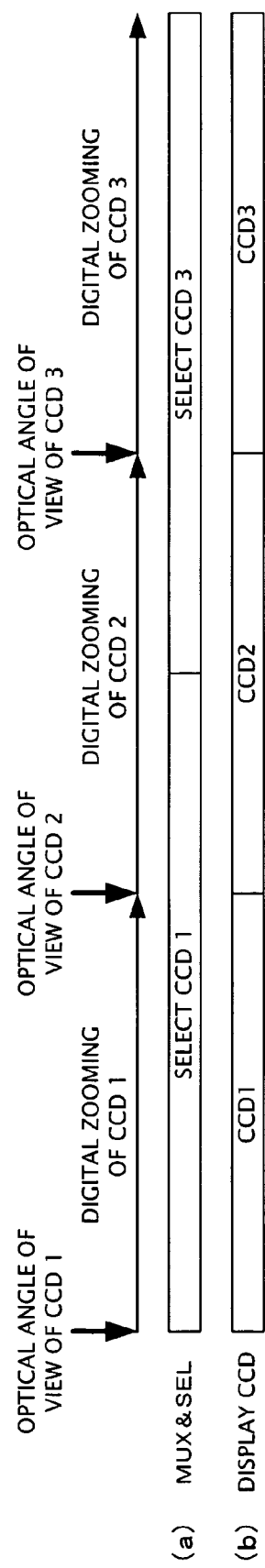
FIG. 10 is a switching timing descriptive view (from a wide side to a telephotography side) of the configuration shown in FIG. 9.

FIG. 10 shows example switching timing adopted in the configuration shown in FIG. 9. This example relates to a case where the zoom switch is sequentially actuated from the wide side to the telephotography side. An optical angle of view of the first image sensor 12 (a CCD 1), an optical angle of view of the second image sensor 14 (a CCD 2), and an optical angle of view of the third image sensor 16 (a CCD 3) are shown in the drawing. FIG. 10A shows an image sensor selected by the multiplexer 20 and the selector 21, and FIG. 10B shows an image of an image sensor displayed on the LCD 70. The unique angle of view of the first image sensor 12 is located at the wide end; the unique angle of view of the second image sensor 14 is located at an intermediate position (which is taken as a first threshold position); and the unique angle of view of the third image sensor 16 is located on the telephotography side (which is taken as a second threshold position). When the zoom position set by means of actuation of the zoom switch is located in a position between the wide end and the first threshold position, the multiplexer 20 and the selector 21 select the first image sensor 12 (the CCD 1), and the image of the first image sensor 12 is displayed on the LCD 70. Specifically, when the zoom position is located at the wide end, the image captured by the first image sensor 12 is displayed on the LCD 70. An electronic zoomed image—which is formed by electronically enlarging the image signal from the first image sensor 12—is displayed in an area on the LCD 70 between the wide end and the first threshold position. When the zoom position has reached the first threshold position, the output of the first image sensor 12 is switched to the output of the second image sensor 14, and the image captured by the second image sensor 14 is displayed on the LCD 70. When the zoom position is located between the first threshold position and the second threshold position, an electronic zoomed image—which is formed by electronically enlarging the image signal from the second image sensor 14—is displayed on the LCD 70. In the meantime, the first image sensor 12 and the third image sensor 16 are not used, and hence the multiplexer 20 and the selector 21 may select either the first image sensor 12 or the third image sensor 16. For instance, as illustrated, the first image sensor 12 is switched to the third image sensor 16 at an intermediate position between the first threshold position and the second threshold position, thereby preparing for an output from the third image sensor 16. When the zoom position has reached the second threshold position, the output of the second image sensor 14 is switched to the output of the third image sensor 16, whereby the image captured by the third image sensor 16 is displayed on the LCD 70. When the zoom position is located at a position closer to the telephotography side than to the second threshold position; namely, when the zoom position is located between the second threshold position and the telephotography position, an electronically zoomed image—which is formed by electronically enlarging an image signal from the third image sensor 16—is displayed on the LCD 70.

Figure 11:
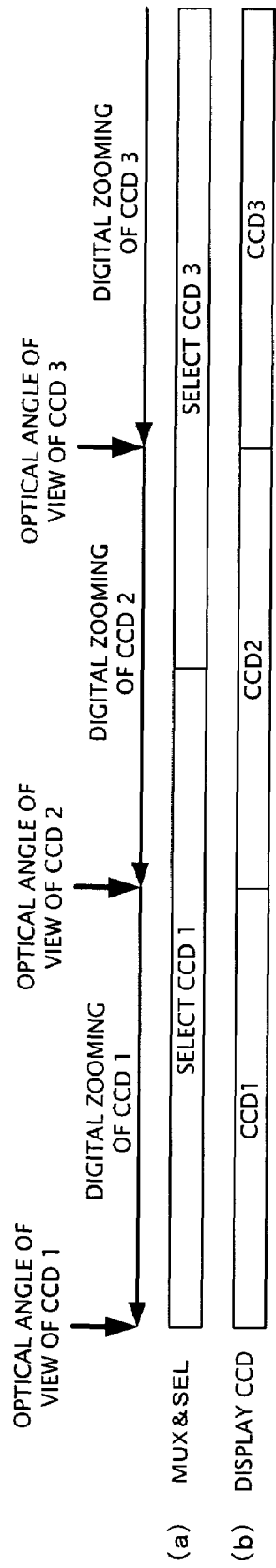
FIG. 11 is a switching timing descriptive view (from a telephotography side to a wide side) of the configuration shown in FIG. 9.

FIG. 11 shows a timing when the zoom switch is actuated from the telephotography side to the wide side. The switching timing is basically identical with that adopted in FIG. 10. During the period in which the zoom position is shifted from the telephotography end to the second threshold position, an electronically zoomed image—which is formed by electronically enlarging an image signal from the third image sensor 16—is displayed on the LCD 70. During the period in which the zoom position is shifted from the second threshold position to the first threshold position, an electronically zoomed image—which is formed by electronically enlarging an image signal from the second image sensor 14—is displayed on the LCD 70. During the period in 15 which the zoom position is shifted from the first threshold position to the wide end, an electronically zoomed image—which is formed by electronically enlarging an image signal from the first image sensor 12—is displayed on the LCD 70. Before the zoom position reaches an intermediate location between the second threshold position and the first threshold position, the multiplexer 20 and the selector 21 select the third image sensor 16. At a point in time when the intermediate position between the second threshold position and the first threshold position has been attained, the first image sensor 12 is selected in lieu of the third image sensor 16.

When zooming-in is effected from the wide end to the telephotography end, an image signal from an image sensor having a smaller image size can be used for detecting a focus position. However, when displaying and image-capturing operations are performed through use of an image sensor of a smaller image size, the focus position has been detected in advance by use of an image signal from the image sensor of a larger image size. When panning is performed, automatic focusing can be carried out at high speed by using the history of detection of the focus position.

Figure 12:
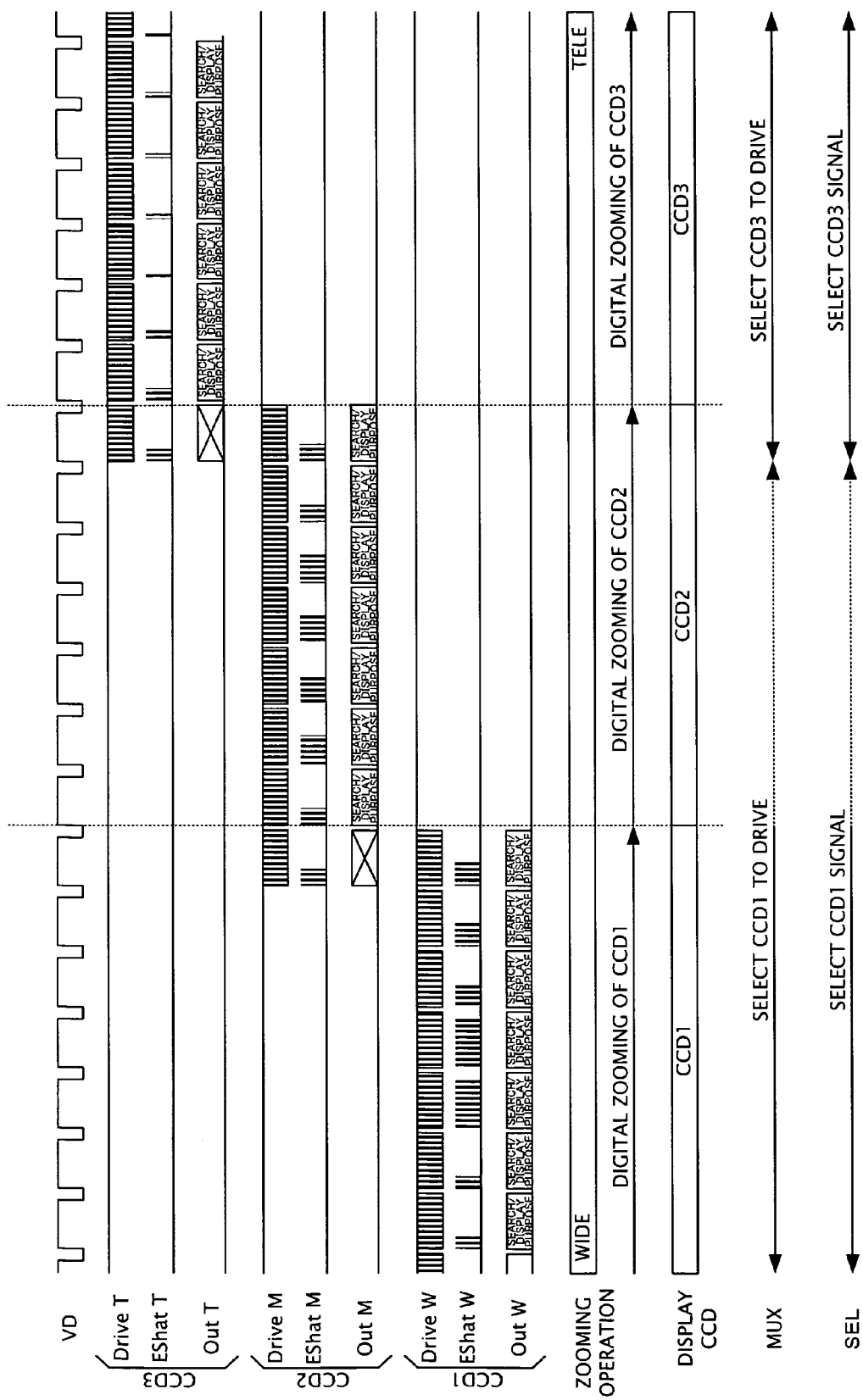
FIG. 12 a timing chart of the configuration shown in FIG. 9.

FIG. 12 shows drive timing charts synchronized with actuation of the zoom switch. The timing charts are shown while being broken down into a timing chart of the first image sensor 12 (the CCD 1), a timing chart of the second image sensor 14 (the CCD 2), and a timing chart of the third image sensor 16 (the CCD 3). An image signal of the first image sensor 12 is output in unmodified form or in an electronically-enlarged manner before the zoom position reaches the first threshold position from the wide end. Specifically, a drive signal from the driver 15 is supplied to the first image sensor 12 via the multiplexer 20, and the image signal from the first image sensor 12 is supplied to the system controller and back end processor 40a via the selector 21 and further to the LCD 70. Reference symbol EShat designates a drive signal for the electronic shutter. The signal output from the first image sensor 12 is supplied to the LCD 70 for displaying purpose and used as a focus position detection signal for automatic focusing purpose, as well. Activation of the second image sensor 14 is commenced at a timing immediately before the zoom position reaches the first threshold position. At a point in time when the zoom position has reached the first threshold position, the output from the first image sensor 12 is switched to the output from the second image sensor 14 and displayed on the LCD 70, or a focus position is detected. Before the zoom position reaches the second threshold position from the first threshold position, the image signal from the second image sensor 14 is output in an unmodified manner or an electronically-enlarged manner. Activation of the third image sensor 16 is commenced at a timing immediately before the zoom position reaches the second threshold position. At a point in time when the zoom position has reached the second threshold position, the output from the second image sensor 14 is switched to the output from the third image sensor 16 and displayed on the LCD 70, or a focus position is detected.

In the above embodiment, both the image signal for display purpose and the image signal used for detecting a focus position are taken as image signals for the selected image sensor. Next will be described an example where the image signal used for detecting a focus position is taken as an image signal for an image sensor of a smaller size.

Figure 13:
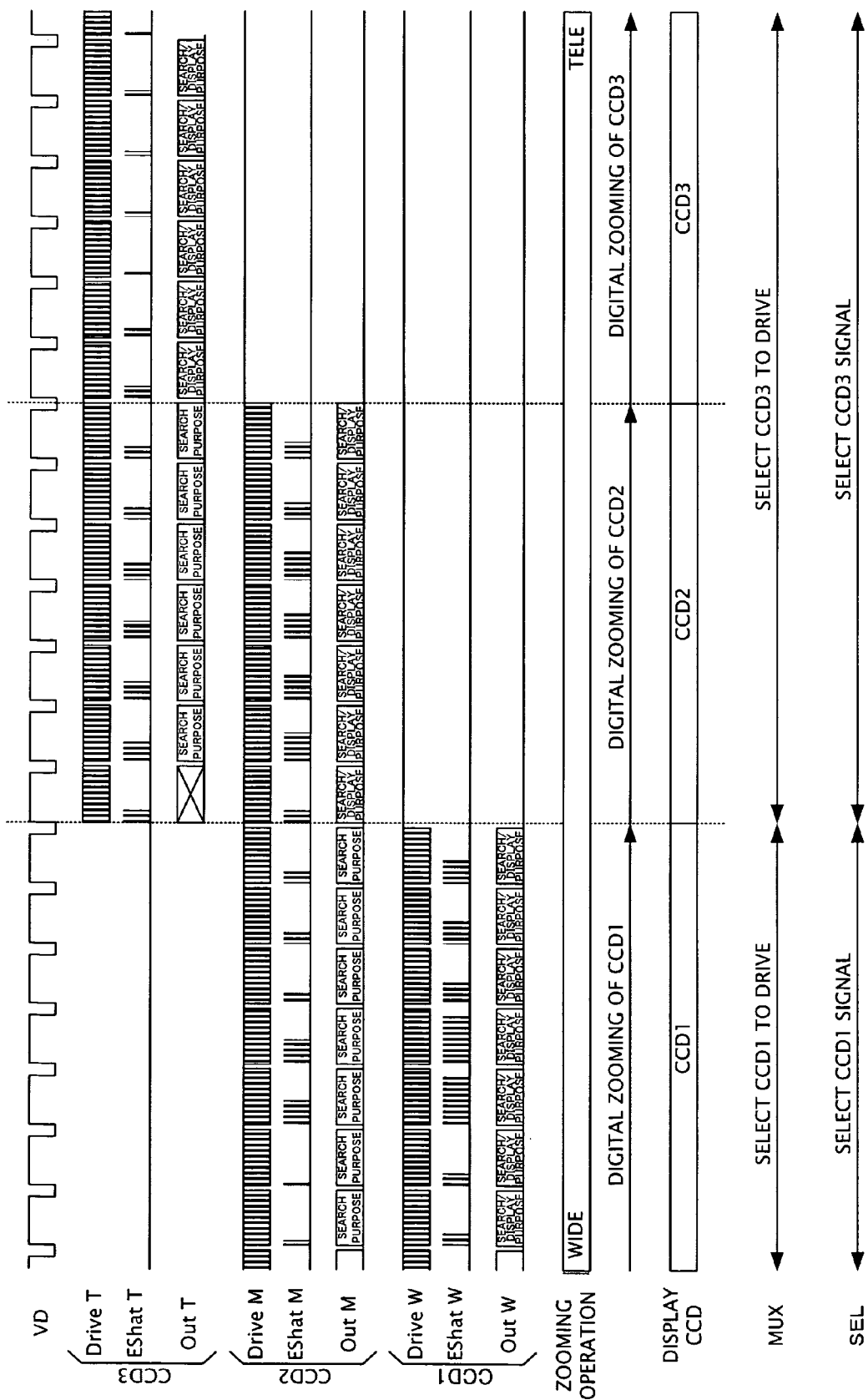
FIG. 13 is another timing chart of the configuration shown in FIG. 9.

FIG. 13 shows another drive timing chart synchronized with actuation of the zoom switch. A difference between FIGS. 12 and 13 lies in a timing at which driving of the second image sensor 14 and the third image sensor 16, which are synchronized with actuation of the zoom switch, is commenced. Specifically, when the zoom position is located at the wide end, the first image sensor 12 is driven, and driving of the second image sensor 14 is also started. Since the driver 15 of the first image sensor 12 is different from the driver 13 of the second image sensor 14, the first image sensor 12 and the second image sensor 14 can be simultaneously driven. As mentioned above, when the zoom position is situated between the wide end and the first threshold position, the first image sensor 12 and the second image sensor 14 are simultaneously driven by the drivers 13, 15. The image signal output from the first image sensor 12 is supplied to and displayed on the LCD 70 and used for detecting a focus position, as well. The image signal from the second image sensor 14 is solely used for detecting a focus position. The significance of both image signals employed during detection of a focus position is as has been described previously. The image signal from the second image sensor 14 is used for detecting a focus position in an essentially-center location of the angle of view of the first image sensor 12, and the image signal from the first image sensor 12 is used for detecting a focus position in a surrounding area. The image signal from the first image sensor 12 and the image signal from the second image sensor 14 can also be used for detecting the focus position in the essentially-center area. However, in consideration of the accuracy of metering, weighting the image signal from the second image sensor 14 is preferable. When the zoom position has reached the first threshold position, driving of the first image sensor 12 is ceased, and instead driving of the third image sensor 16 is commenced. Specifically, at a point in time when the zoom position has reached the first threshold position, the multiplexer 20 outputs the drive signal from the driver 15 to the third image sensor 16 rather than to the first image sensor 12. Consequently, when the zoom position is situated between the first threshold position and the second threshold position, the second image sensor 14 and the third image sensor 16 are simultaneously driven by the drivers 13, 15. The image signal from the second image sensor 14 is supplied to and displayed on the LCD 70, and is further used for detecting a focus position. The image signal from the third image sensor 16 is used solely for detecting a focus position. When the zoom position has reached the second threshold position, driving of the second image sensor 14 is ceased, and the image signal from the third image sensor 16 is supplied to and displayed on the LCD 70. When the zoom position is located closer to the telephotograph side with reference to the second threshold position, the image signal from the third image sensor 16 is used for display and detecting a focus position.

Figure 14:
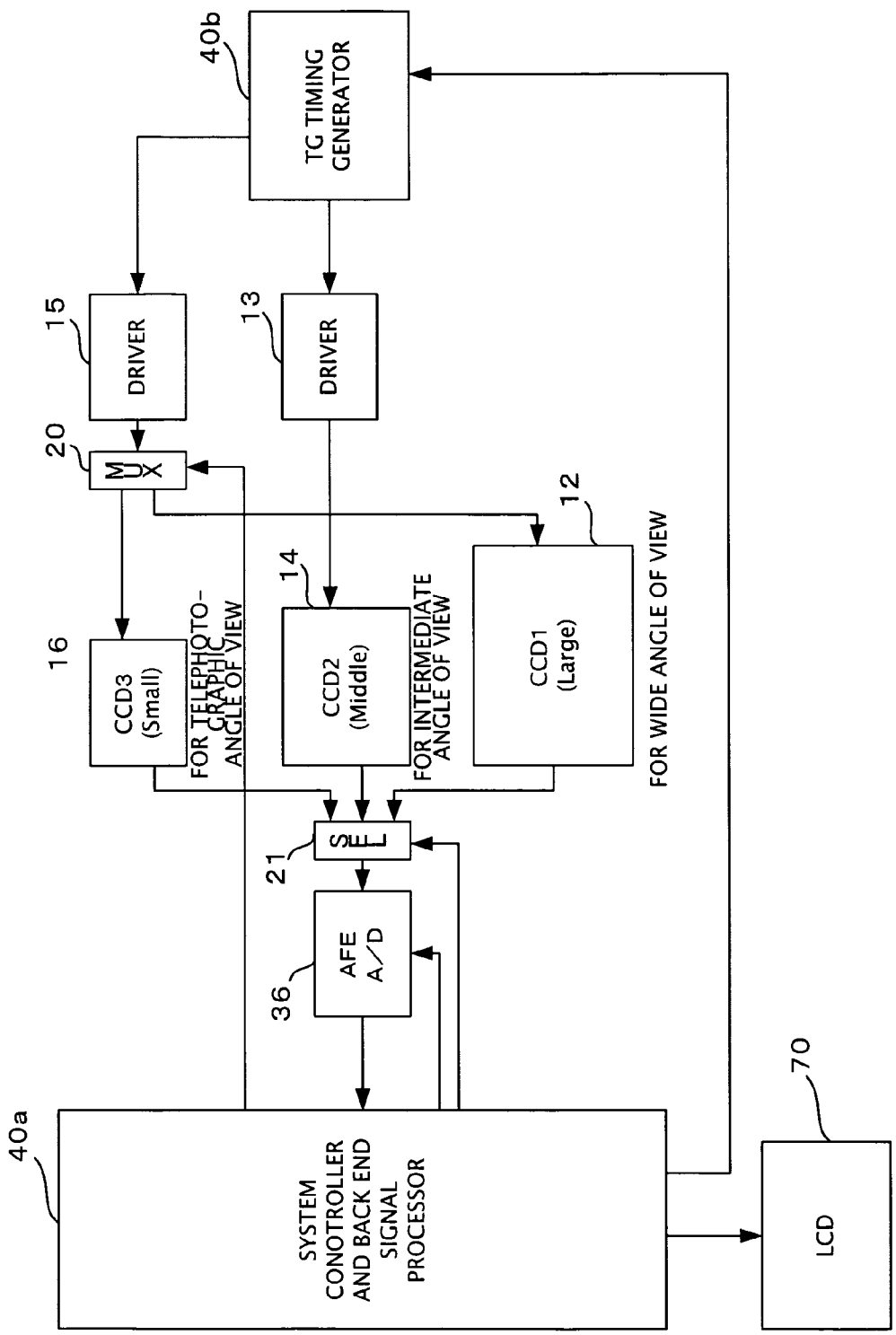
FIG. 14 is a diagram of another drive circuit for a digital camera having three image sensors.

FIG. 14 shows another detailed configuration of a drive circuit of the digital camera. FIG. 14 differs from FIG. 9 in that a single AFE and A/D converter 36 is provided in place of the AFE and A/D converters 36a, 36b; that all of outputs from the first image sensor 12, the second image sensor 14, and the third image sensor 16 are supplied to the selector 21; and that the selector 21 effects selective switching among the outputs and supplies a selected output to the AFE and A/D converter 36. The drivers 13, 15 can simultaneously drive the first image sensor 12 and the second image sensor 14, and the second image sensor 14 and the third image sensor 16 can be driven simultaneously. However, the AFE and A/D converter 36 does not process outputs from these sensors in parallel, but sequentially processes the outputs and supplies the results to the LCD 70.

Figure 15:
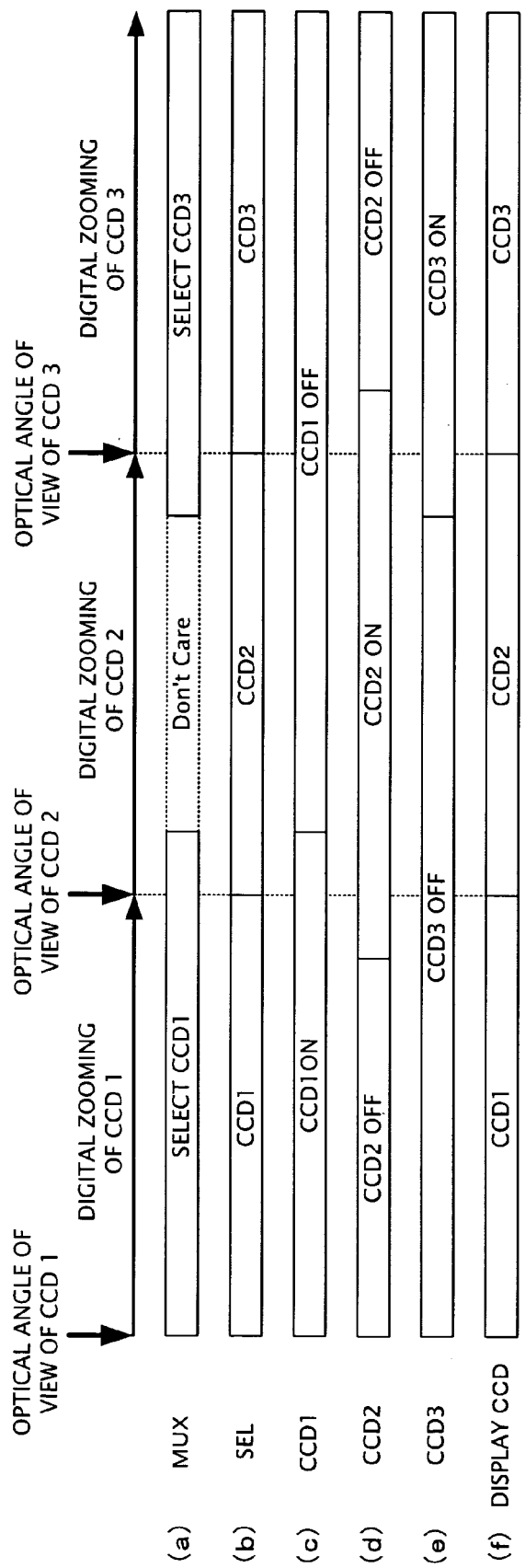
FIG. 15 is a view for describing switching timing of the configuration shown in FIG. 14.

FIG. 15 shows switching timing adopted in the configuration shown in FIG. 14. When the zoom position is situated between the wide end and the first 15 threshold position, the multiplexer 20 and the selector 21 select the first image sensor 12 (CCD 1). Meanwhile, the first image sensor 12 is basically driven (activated), and the second image sensor 14 and the third image sensor 16 enter an undriven (deactivated) state. Even when the zoom position has exceeded the first threshold position, the first image sensor 12 continues to be driven for a while, and driving of the second image sensor 14 is commenced immediately before the zoom position reaches the first threshold position. When the zoom position is situated between the first threshold position and the second threshold position, the first image sensor 12 and the third image sensor 16 are not used. Hence, an arbitrary of the signals from the multiplexer 20 is arbitrarily selected (independently). However, the third image sensor 16 should have been selected immediately before arrival of the zoom position at the second threshold position. The first image sensor 12 is in an undriven state; the second image sensor 14 is driven; and the third image sensor 16 is also in an undriven state. However, driving of the third image sensor 16 is commenced immediately before arrival of the zoom position at the second threshold position. Even after the zoom position has arrived at the second threshold position, the second image sensor 14 continues to be driven for a while.

Figure 16:
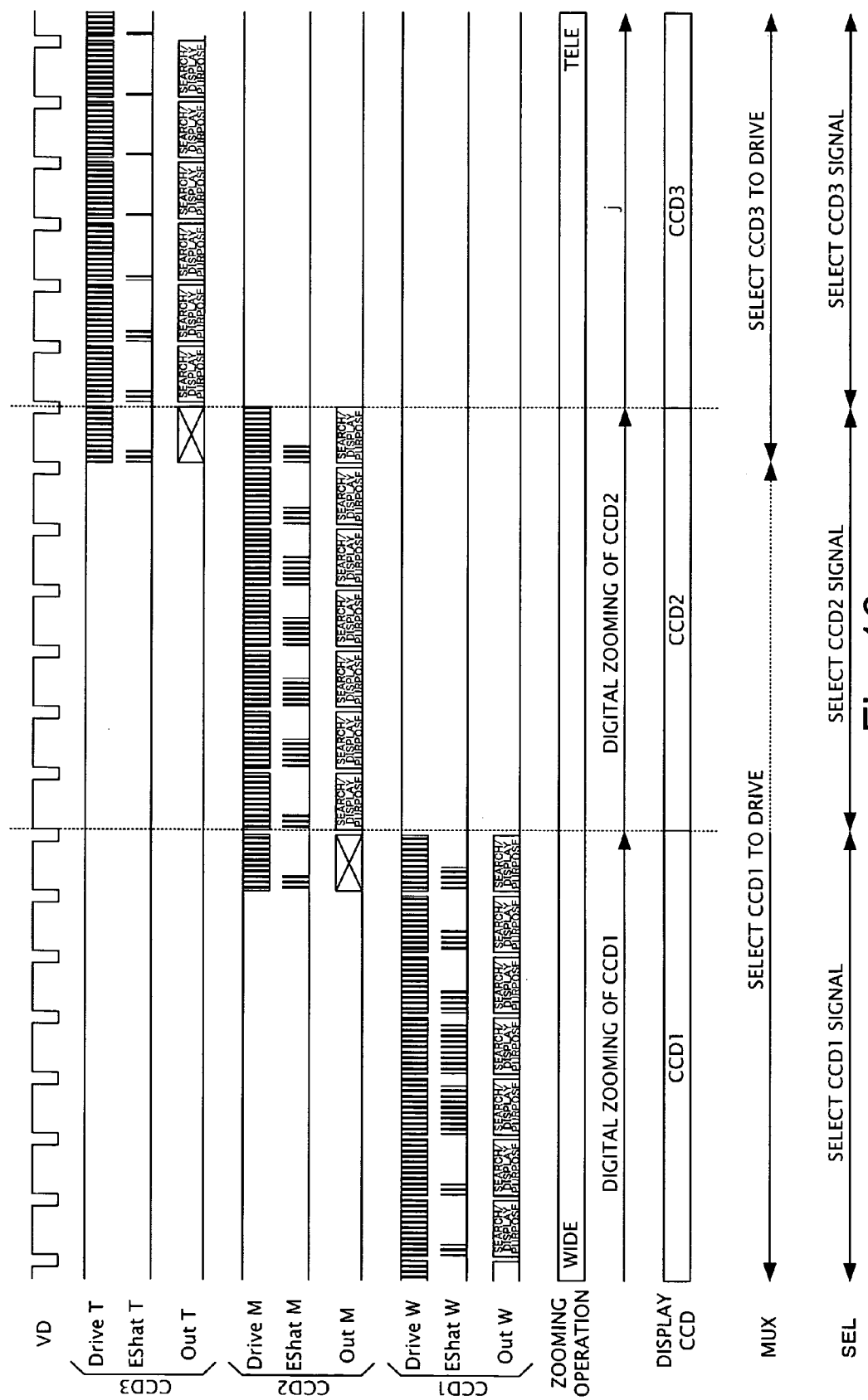
FIG. 16 is another timing chart of the configuration shown in FIG. 14.

FIG. 16 shows the timing chart adopted in the configuration shown in FIG. 14. FIG. 16 is the same as FIG. 12. Since the AFE and A/D converter 36 is single, the configuration of the digital camera is simplified. However, while the output from the first image sensor 12 is supplied to and continues being displayed on the LCD 70, a focus position cannot be detected by use of an output from the second image sensor 14.

Figure 17:
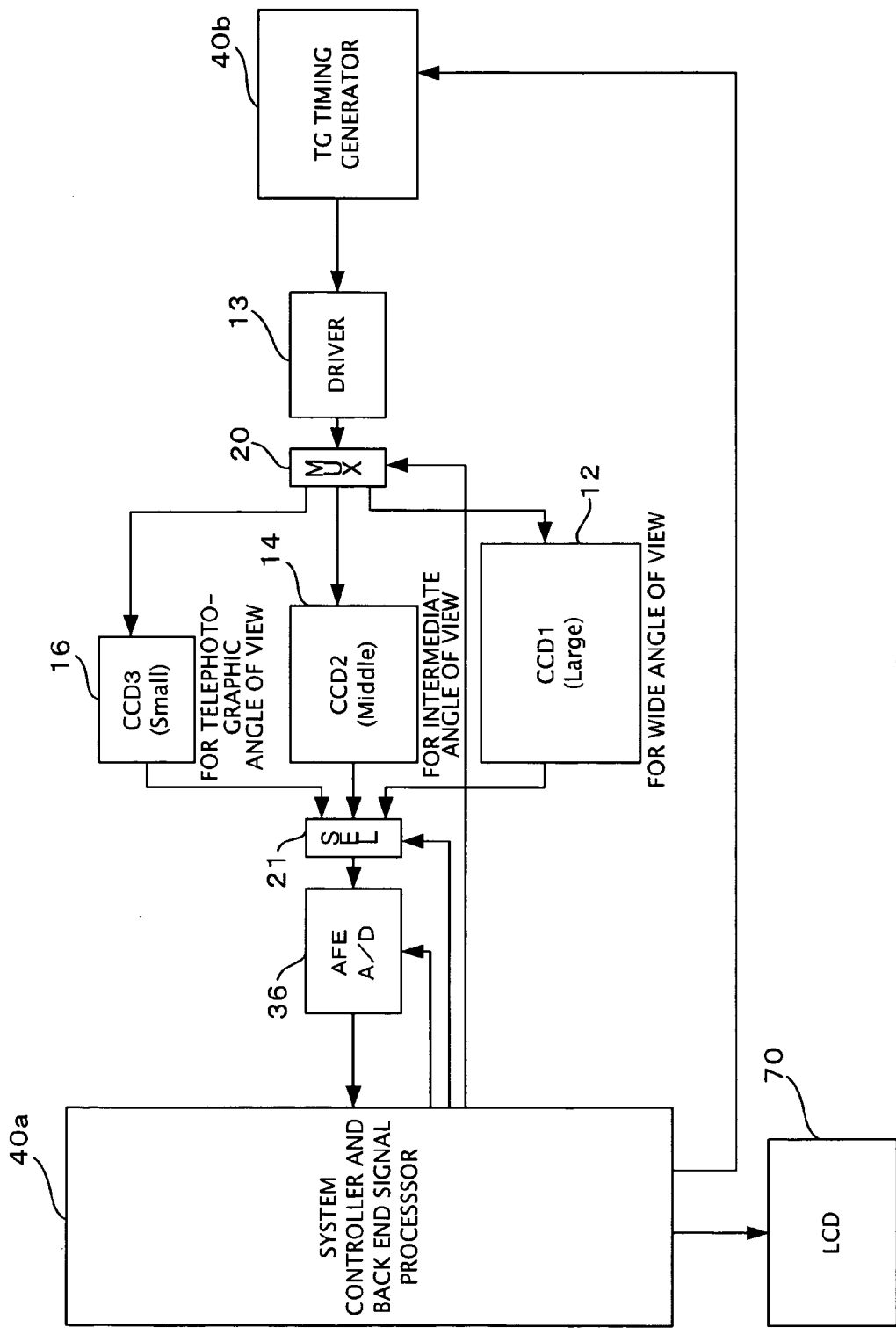
FIG. 17 is a diagram of yet another drive circuit for a digital camera having three image sensors.

FIG. 17 shows still another detailed configuration of a drive circuit of the digital camera. FIG. 17 differs from FIG. 14 in that a single driver 13 is provided in place of the drivers 13 and 15; namely, the first image sensor 12, the second image sensor 14, and the third image sensor 16 share a driver. A drive signal generated by the driver 13 is supplied to the multiplexer 20. The multiplexer 20 switchingly outputs the drive signal to the first image sensor 12, the second image sensor 14, and the third image sensor 16. Since the three image sensors 12, 14, and 16 share the driver 13, the three image sensors 12, 14, and 16 cannot be driven concurrently and are driven at different timings in accordance with the zoom position. As the zoom switch is sequentially actuated from the wide side to the telephotography side, the first image sensor 12 is driven first; the second image sensor 14 is then driven; and then the third image sensor 16 is driven. When the first image sensor 12 is in a driven state, the second image sensor 14 and the third image sensor 16 are in an undriven state. When the second image sensor 14 is in a driven state, the first image sensor 12 and the third image sensor 16 are in an undriven state. When the third image sensor 16 is in a driven state, the first image sensor 12 and the second image sensor 14 are in an undriven state. Although the configuration can be simplified to a greater extent than the configuration shown in FIG. 14, the second image sensor 14 cannot be driven in advance before the first image sensor 12 is switched to the second image sensor 14 at the first threshold position. Therefore, an image signal cannot be output from the second image sensor 14 immediately after switching, and consequently a time lag arises. This time lag induces a blackout—no signal—on the screen of the LCD 70.

Figure 18:
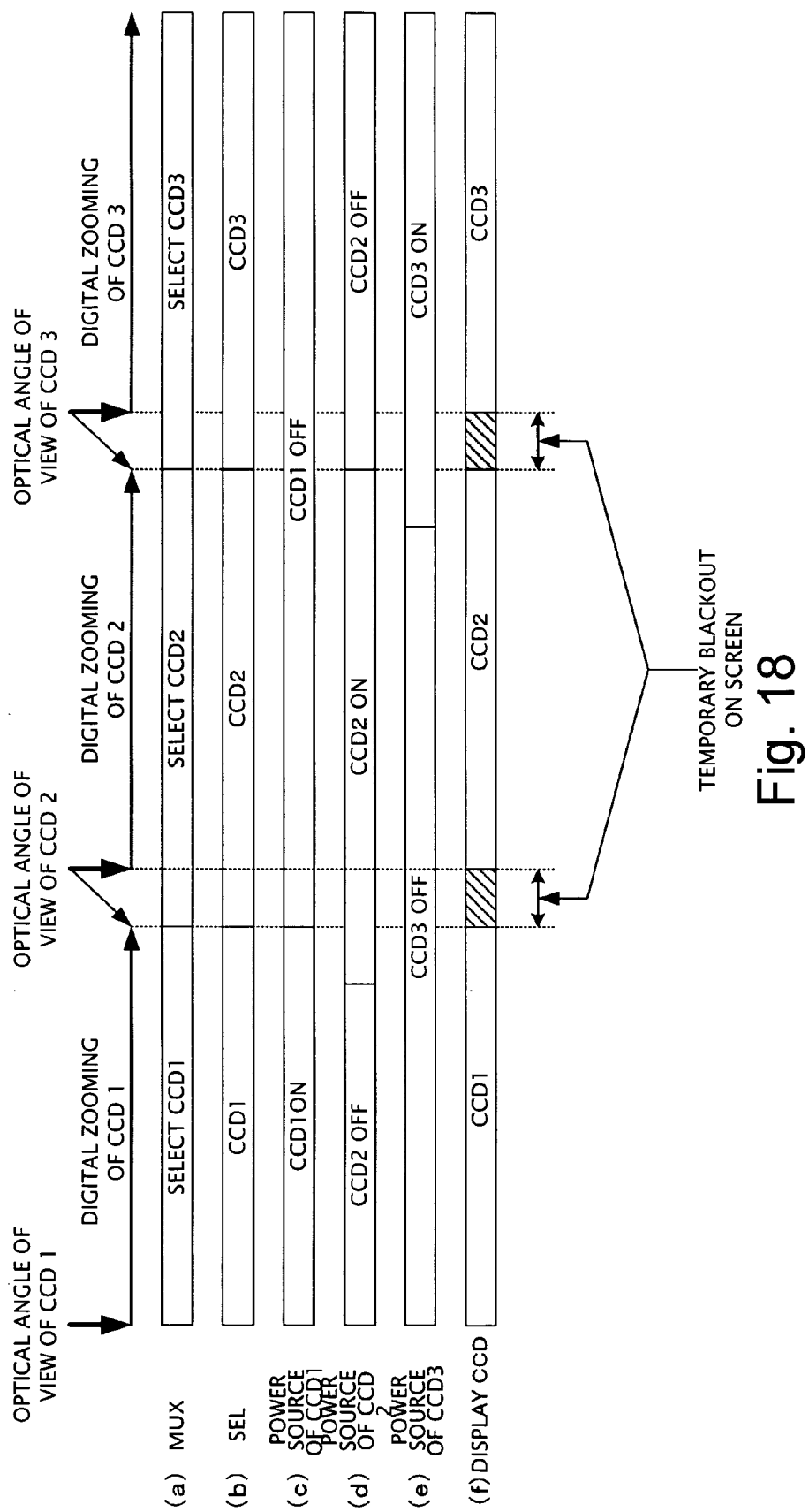
FIG. 18 is a view for describing switching timing of the configuration shown in FIG. 17.

FIG. 18 shows switching timing adopted in the configuration shown in FIG. 17. Switching arises at the first threshold position with respect to the optical angle of view of the second image sensor 14 (the CCD 2). As illustrated, the power of the second image sensor 14 has been switched from a deactivated state to an activated state in advance. However, since a time lag exists during a period from supply of the drive signal until output of an actual image signal, a temporary blackout is induced on the screen. Meanwhile, occurrence of a blackout can also be avoided by means of causing the LCD 70 to keep displaying the image of the first image sensor 12 (freezing an image). Likewise, switching arises even in the second threshold position with respect to the optical angle of view of the third image sensor 16 (the CCD 3). The power of the third image sensor 16 is switched from the deactivated state to the activated state in advance. However, a time lag exists during a period from actual supply of a drive signal until actual output of an image signal, so that a temporary blackout appears on the screen. Instead of the temporary blackout of the screen, the frozen image of the CCD 1 may be displayed during switching of the CCD 1 to the CCD 2, or the frozen image of the CCD 2 or CCD 1 may be displayed when the CCD 2 is switched to the CCD 3.

Figure 19:
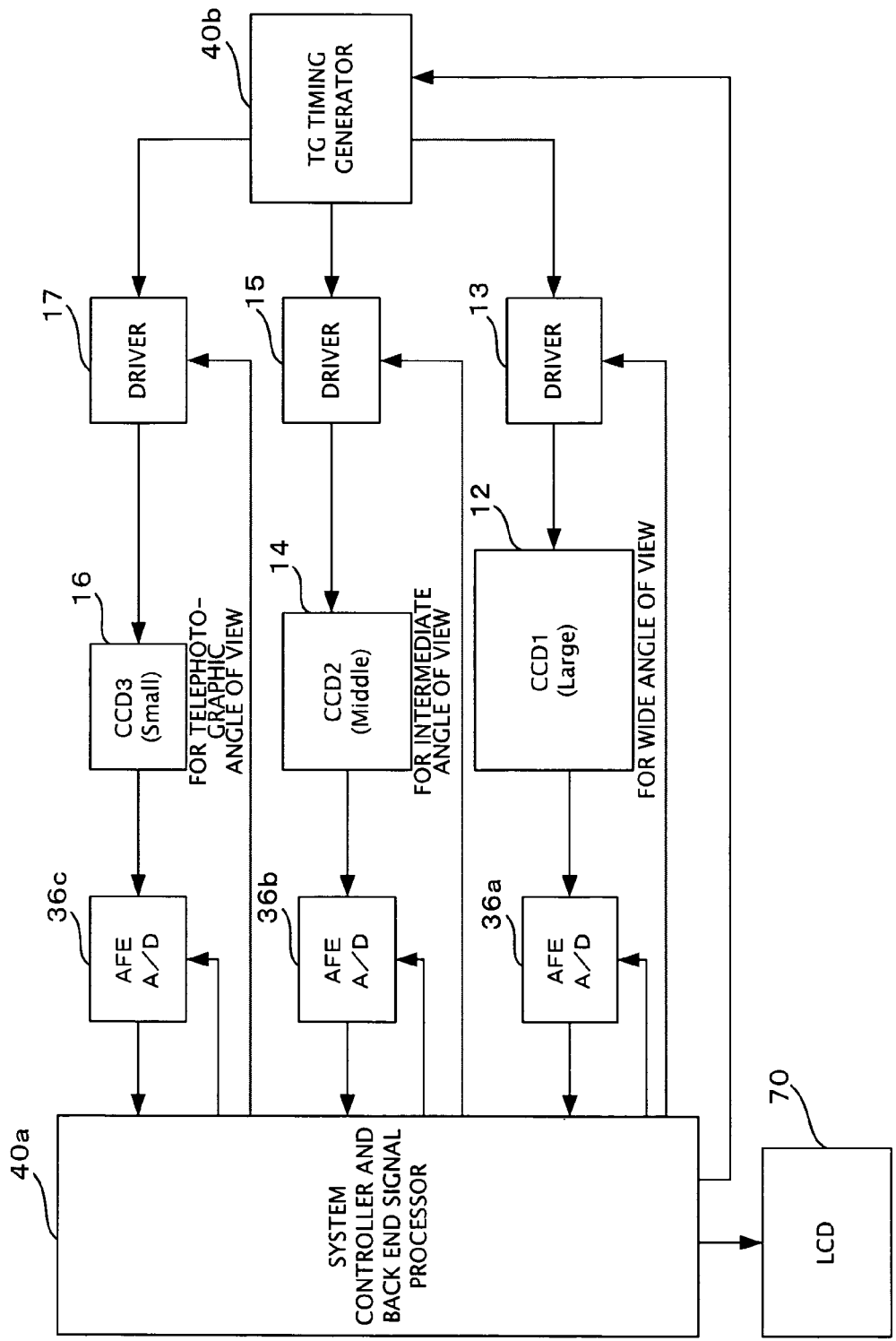
FIG. 19 is a diagram of still another drive circuit for a digital camera having three image sensors.

FIG. 19 shows yet another detailed configuration of a drive circuit of the digital camera. A driver and an AFE and A/D converter are provided for each of the image sensors 12, 14, and 16. Specifically, the driver 13 drives the first image sensor 12; the driver 15 drives the second image sensor 14; and a driver 17 drives the third image sensor 16. The output from the first image sensor 12 is supplied to the AFE and A/D converter 36a; the output from the second image sensor 14 is supplied to the AFE and A/D converter 36b; and the output from the third image sensor 16 is supplied to an AFE and A/D converter 36c. Since all of the image sensors 12, 14, and 16 can be driven simultaneously, a wide image, an intermediate image, and a telephotographic image, which are acquired by the image sensors 12, 14, and 16, can be displayed in a merged manner. Alternatively, two arbitrary images among the three images can be displayed in a merged manner. Since the third image sensor 16 can be left driven at all times, the output from the third image sensor 16 can also be used for detecting a focus at all times.

<When the Digital Camera has Four Image Sensors>

Figure 20:
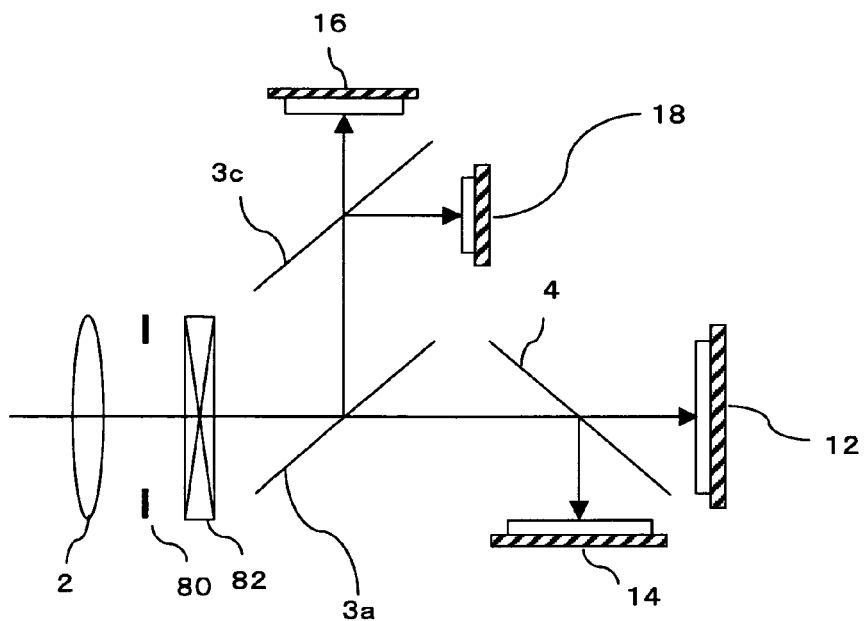
FIG. 20 is a conceptual block diagram of a digital camera having four image sensors.

FIG. 20 shows the conceptual configuration of a digital camera of the present embodiment. The digital camera comprises the lens 2, the aperture 80, the shutter 82, the three beam splitters 3a, 3c, and 4 for splitting light from the lens 2 into two beams, the two image sensors 12, 14 for receiving the light output from the beam splitter 4, and two image sensors 16, 18 for receiving light from the beam splitter 3c. Specifically, light is first split into two beams by means of the beam splitter 3a. One beam is further split into two sub-beams by means of the beam splitter 4. The thus-split sub-beams enter the first image sensor 12 and the second image sensor 14. The remaining beam split by the beam splitter 3a is further split into two sub-beams by the beam splitter 3c. The thus-split sub-beams enter the third image sensor 16 and the fourth image sensor 18. The first image sensor 12, the second image sensor 14, the third image sensor 16, and the fourth image sensor 18 are equal to each other in terms of the number of pixels, but differ from each other in terms of an image size (a pixel size).

Specifically, there exists a relationship of the image size of the first image sensor 12>the image size of the second image sensor 14>the image size of the third image sensor 16>the image size of the fourth image sensor 18. The lens 2 is a fixed-focal-length lens. The image sensors 12, 14, 16, and 18 differ from each other in terms of an image size. Hence, angles of view acquired by the image sensors differ from each other. The first image sensor 12 has a wide angle of view; the second image sensor 14 has an intermediate angle of view; the third image sensor 16 has an angle of view which is narrower than the intermediate angle of view; and the fourth image sensor 18 has a narrow angle of view (a telephotographic angle of view). Switching among the wide angle of view, the (two) intermediate angles of view, and the narrow angle of view can be performed by means of appropriately switching the four image sensors 12, 14, 16, and 18. Optical zooming action can also be realized even when the lens 2 is embodied as a fixed-focal-length lens. Switching among the wide angle of view, the intermediate angles of view, and the narrow angle of view can be performed by means of actuation of the zoom switch or actuation of the switch for toggling among the image sensors 12, 14, 16, and 18. When switching among the wide angle of view, the intermediate angle of view, and the narrow angle of view is performed by means of actuation of the zoom switch, the first image sensor 12 is selected on the wide side; the second image sensor 14 or the third image sensor 16 is selected at the intermediate position; and the fourth image sensor 18 is selected on the telephotography side. When the zoom switch is actuated sequentially from the wide side to the telephotography side, the wide image acquired by the first image sensor 12 is first obtained, and an electronically zoomed image of the first image sensor 12 is sequentially acquired in response to actuation of the zoom switch. When the unique angle of view of the second image sensor 14 has been attained, the first image sensor 12 is switched to the second image sensor 14, whereby the intermediate image of the second image sensor 14 is output. When the zoom switch is further actuated sequentially to the telephotography side, electronically zoomed images of the second image sensor 14 are sequentially acquired. When the angle of view of the third image sensor 16 has been attained, the second image sensor 14 is switched to the third image sensor 16, whereby the image of the third image sensor 16 is output. When the zoom switch is sequentially operated to the telephotography side, electronically zoomed images of the third image sensor 16 are sequentially acquired. When the angle of view of the fourth image sensor 18 has been attained, the third image sensor 16 is switched to the fourth image sensor 18, and the image of the fourth image sensor 16 is output.

Specific configurations of the drive circuit include a configuration where each of the image sensors 12, 14, 16, and 18 is independently provided with a driver; a configuration where the first image sensor 12 and the fourth image sensor 18 share a driver; a configuration where the first image sensor 12 and the third image sensor 16 share a driver and the second image sensor 14 and the fourth image sensor 18 share another driver; a configuration where all of the image sensors 12, 14, 16, and 18 share a driver; and the like.

Figure 21:
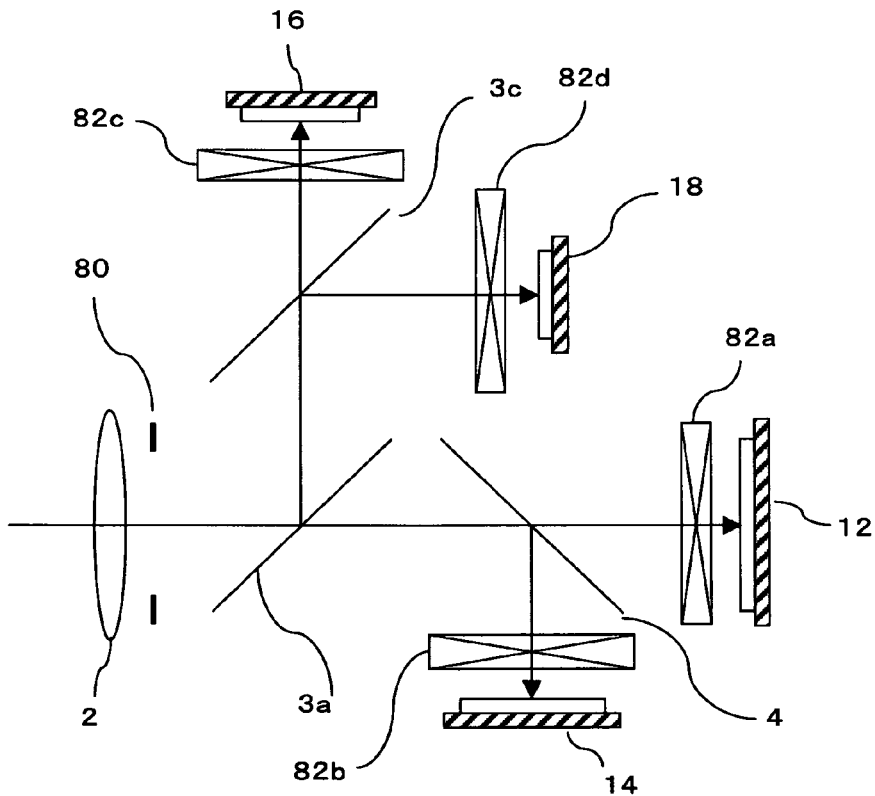
FIG. 21 is a view for describing the layout of a shutter.
Figure 22:
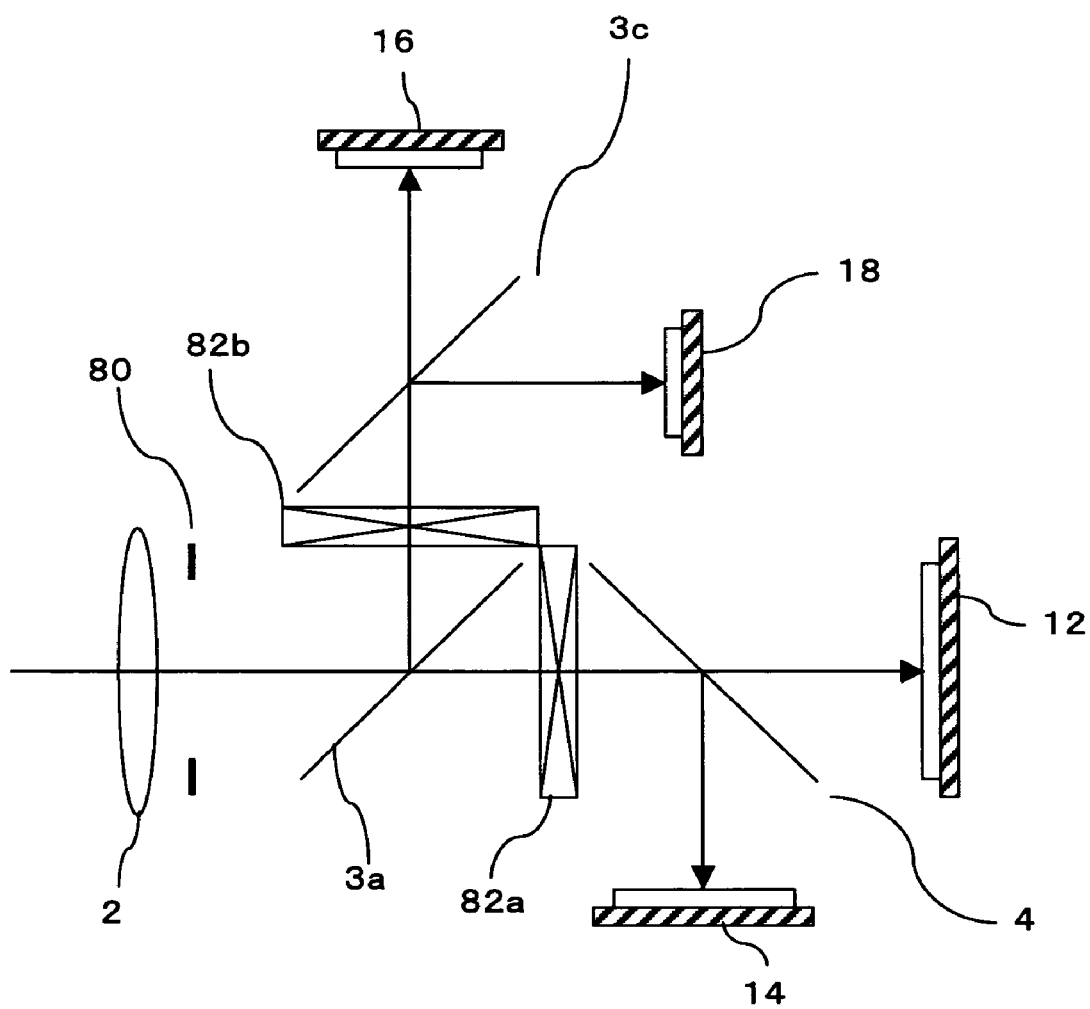
FIG. 22 is a view for describing another layout of the shutter.
Figure 23:
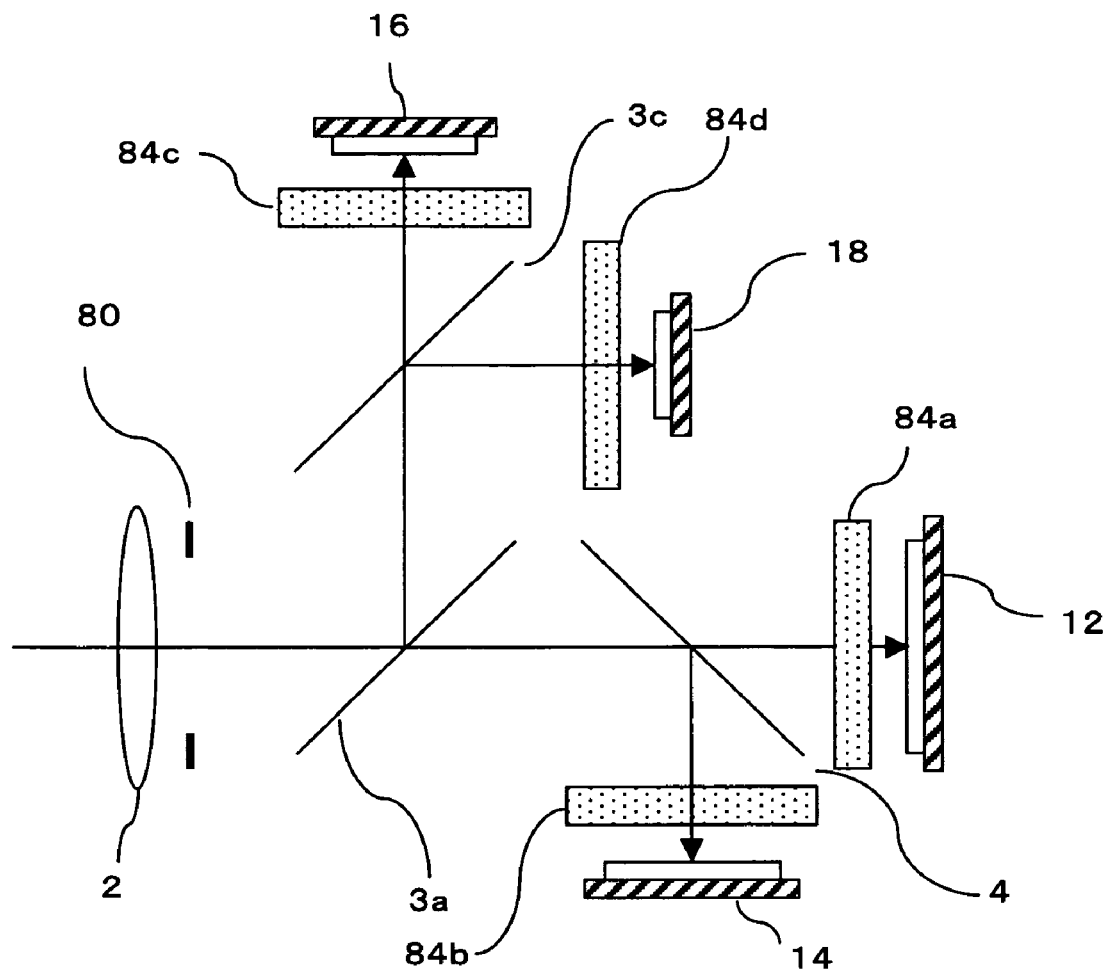
FIG. 23 is a view for describing the layout of an ND filter.

In the present embodiment, the shutter 82 is provided in common to a plurality of image sensors, or is provided for every image sensor. FIGS. 21 and 22 show an example configuration employed in the present embodiment. In FIG. 21, the image sensors 12, 14, 16, and 18 are respectively provided with shutters 82a, 82b, 82c, and 82d in place of the common shutter 82 shown in FIG. 20. The respective shutters 82a to 82d are controlled in an opening/closing manner such that each of the image sensors assumes an optimal exposure time. For instance, when the aperture value of the aperture 80 and the open time of the shutter 82a are set with reference to the image sensor 12, open times of the shutters 82b, 82c, and 82d are adjusted so as to compensate for differences among sensitivities of the image sensors while the aperture 80 is maintained at the set aperture value. In FIG. 22, a shutter 82a common to the image sensors 12 and 14 and a shutter 82b common to the image sensors 16 and 18 are provided in lieu of the common shutter 82 shown in FIG. 20. Although the aperture 80 of the present embodiment is provided in common to the plurality of image sensors, the aperture 80 may also be fixed to an aperture value at which the quantity of exposure of the image sensor that serves as a reference becomes optimum, or the aperture value may be adjusted in response to switching of the image sensor. Adjustment of the aperture value of the aperture 80 can also be combined with adjustment of the open times of the shutters provided for the respective image sensors, which enables more elaborate control of the quantity of exposure. As a result, occurrence of changes in exposure, which would otherwise occur in association with switching between the image sensors, can be prevented. Alternatively, adjustment of the aperture value of the aperture 80 may also be combined with adjustment of gains of the respective image sensors. The quantity of exposure can be controlled by means of any one of the aperture value of the aperture 80, the transmission factor of a beam splitter, a gain, and the open time of a shutter; or an arbitrary combination thereof. ND filters (neutral concentration filters) can also be provided as exposure level control means in place of the shutters. FIG. 23 shows an example where ND filters 84a to 84d are provided in lieu of the shutters 82a to 82d shown in FIG. 21. In FIG. 21, the ND filter 84a is provided in place of the shutter 82a; the ND filter 84b is provided in place of the shutter 82b; the ND filter 84c is provided in place of the shutter 82c; and the ND filter 84d is provided in place of the shutter 84d. The shutters and the ND filters can also be provided mixedly. For instance, in FIG. 21, it may be the case that only the shutter 82a is replaced with the ND filter 84a, or the like.

In the above embodiment, the user sets switching of zooming action through use of the switches USW 1 to USW 4. When an automatic button is additionally provided and the automatic button has been depressed, a variable-focal-length lens is reset to the wide end. During a period in which the zoom switch USW 4 is depressed, the image sensors are sequentially subjected to electronic zooming in descending sequence from an image sensor of a large pixel size. Moreover, the image sensor is switched at an appropriate angle of view. When the unique angle of view of the image sensor having the smallest pixel size has been attained, zooming operation may also be performed from that point by use of a variable-focal-length lens. Thus, zoom switching can be performed smoothly, and a zoom area of superior image quality can be ensured.

PARTS LIST 2 lens
3a beam splitter
3b beam splitter
3c beam splitter
4 beam splitter
5 screen
6 finder lens
12 image sensor
13 vertical clock driver
14 image sensor
15 vertical clock driver
16 image sensor
18 sensor
20 multiplexer
21 selector
22 analogue signal processor
25 power control
36 A/D converter
36a A/D converter
36b A/D converter
36c A/D converter
38 buffer memory 40 timing generator
40a controller
40b timing generator
42 user control circuit
50 image processor
54 memory card
70 color LCD
70a angle of view
70b angle of view
80 aperture
82 shutter
82a shutter
82b shutter
82c shutter
82d shutter
84a ND filter
84b ND filter
84c ND filter
84d ND filter

What is claimed:

1. An image-capturing apparatus comprising:
a single optical system;
split means for splitting light originating from the single optical system into a plurality of lights
a plurality of image-capturing elements which receive the plurality of lights and have the same number of pixels and different pixel sizes; and
drive means for driving the plurality of image-capturing elements;
angle-of-view change operation means;
display means;
control means for outputting, in a switching manner, image signals output from the plurality of image-capturing elements to the display means in response to operation of the angle-of-view change operation means;
wherein the plurality of image-capturing elements are formed from a first image-capturing element and a second image-capturing element which is smaller in pixel size than the first image-capturing element; and
the control means subjects at least the first image-capturing element to electronic zoom control.

2. The image-capturing apparatus according to claim 1, wherein
the plurality of image-capturing elements are formed from a first image-capturing element and a second image-capturing element which is smaller in pixel size than the first image-capturing element; and
the control means outputs an image signal from the first image-capturing element while an angle-of-view change position falls within an area from a wide end of the first image-capturing element to a threshold position set in an angle-of-view change range of the second image-capturing element, and outputs an image signal from the second image-capturing element while the angle-of-view change position falls within a range from the threshold position to a telephotography end.

3. The image-capturing apparatus according to claim 2, further comprising
focus adjustment means for controlling a focus through use of an image signal from the second image-capturing element when an image is captured by use of an image signal from the first image-capturing element.

4. The image-capturing apparatus according to claim 1, wherein the drive means is shared by at least two of the plurality of image-capturing elements.

5. The image-capturing apparatus according to claim 1, further comprising:
aperture means provided in common to the plurality of image-capturing elements, wherein,
when the aperture means is adjusted to a predetermined aperture value by means of a metered value determined by any of the plurality of image-capturing elements, the split means performs splitting operation by means of a spectral transmission factor by means of which an image signal from each of the image-capturing elements assumes an appropriate value while the aperture means is set to the predetermined aperture value.

6. The image-capturing apparatus according to claim 1, further comprising:
aperture means provided in common to the plurality of image-capturing elements; and
gain adjustment means for adjusting, when the aperture means is adjusted to a predetermined aperture value by means of a metered value determined by any of the plurality of image-capturing elements, a gain in such a way that an image signal from each of the image-capturing elements assumes an appropriate value while being set to the aperture value.

7. The image-capturing apparatus according to claim 1, further comprising:
aperture means provided in common to the plurality of image-capturing elements; and
shutter or filter means for adjusting, when the aperture means is adjusted to a predetermined aperture value by means of a metered value determined by any of the plurality of image-capturing elements, a quantity of exposure light in such a way that an image signal from each of the image-capturing elements assumes an appropriate value while being set to the aperture value.

8. The image-capturing apparatus according to claim 1, further comprising:
aperture means provided in common to the plurality of image-capturing elements, wherein
the aperture means is set to a metered value determined by a switched image-capturing element to an aperture value by means of which an optimal quantity of exposure light is achieved, in response to switching of the control means.

9. The image-capturing apparatus according to claim 1, wherein the control means switches an output of an image signal to the second image-capturing element when a zoom-angle-of-view of the first imaging element has achieved a predetermined angle of view.

10. The image-capturing apparatus according to claim 9, wherein the predetermined angle of view is an angle-of-view position set in an angle-of-view range where a second image-capturing element can capture an image.

11. The image-capturing apparatus according to claim 1, wherein the control means performs electronic zoom control operation from a unique angle of view of an image-capturing element of the maximum pixel size to a neighborhood of a unique angle of view of an image-capturing element of the minimum pixel size, and performs zooming operation by means of an optical system from the neighborhood of the unique angle of view of the image-capturing element of the minimum pixel size.

* * * * *